United States Patent
Uchida et al.

(10) Patent No.: US 10,345,092 B2
(45) Date of Patent: Jul. 9, 2019

(54) ANGLE SENSOR SYSTEM

(71) Applicant: TDK CORPORATION, Tokyo (JP)

(72) Inventors: Keisuke Uchida, Tokyo (JP); Hiraku Hirabayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/882,144

(22) Filed: Jan. 29, 2018

(65) Prior Publication Data

US 2018/0274897 A1   Sep. 27, 2018

(30) Foreign Application Priority Data

Mar. 24, 2017 (JP) ................. 2017-059293

(51) Int. Cl.
| | | |
|---|---|---|
| *G01D 5/14* | (2006.01) | |
| *G01D 5/16* | (2006.01) | |
| *G01B 7/14* | (2006.01) | |
| *G01R 33/09* | (2006.01) | |
| *G01B 7/30* | (2006.01) | |
| *G01D 3/02* | (2006.01) | |
| *G01D 5/244* | (2006.01) | |

(52) U.S. Cl.
CPC ............. *G01B 7/30* (2013.01); *G01D 3/02* (2013.01); *G01D 5/145* (2013.01); *G01D 5/24476* (2013.01)

(58) Field of Classification Search
CPC . G01D 5/14; G01D 5/16; G01D 5/244; G01B 7/14; G01B 7/30; G01R 33/09
See application file for complete search history.

(56) References Cited

U.S. PATENT DOCUMENTS

2011/0031965 A1   2/2011   Saruki et al.

FOREIGN PATENT DOCUMENTS

JP           2011-158488 A      8/2011

*Primary Examiner* — Neel D Shah
(74) *Attorney, Agent, or Firm* — Oliff PLC

(57) ABSTRACT

An angle sensor system includes a magnetic field generation unit for generating a rotating magnetic field, and an angle sensor for detecting the rotating magnetic field to generate a detected angle value. The rotating magnetic field contains first and second magnetic field components orthogonal to each other. Each of the first and second magnetic field components contains an ideal magnetic field component, and an error component corresponding to the fifth harmonic of the ideal magnetic field component. The angle sensor includes first and second detection signal generation units. Each of the first and second detection signal generation units includes a magnetic layer whose magnetization direction varies according to the direction of the rotating magnetic field. The magnetic layer is provided with a magnetic anisotropy that is set to reduce an angular error resulting from the error components of the first and second magnetic field components.

15 Claims, 14 Drawing Sheets

ANGLE SENSOR SYSTEM

BACKGROUND OF THE INVENTION

1. Field of the Invention

The present invention relates to an angle sensor system that includes a magnetic field generation unit and an angle sensor.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. An angle sensor system using a magnetic angle sensor is typically provided with a magnetic field generation unit for generating a rotating magnetic field whose direction rotates in response to the rotation or linear movement of an object. The magnetic field generation unit may be a magnet configured to rotate, for example. The angle to be detected by the magnetic angle sensor corresponds to the rotational position of the magnet, for example.

Among known magnetic angle sensors is one that includes a plurality of detection circuits for generating a plurality of detection signals of different phases and generates a detected angle value by performing computations using the plurality of detection signals, as disclosed in JP 2011-158488A. Each of the plurality of detection circuits includes at least one magnetic detection element. The magnetic detection element includes, for example, a spin-valve magnetoresistance element including a magnetization pinned layer whose magnetization direction is pinned, a free layer whose magnetization direction varies according to the direction of the rotating magnetic field, and a nonmagnetic layer located between the magnetization pinned layer and the free layer.

For the magnetic angle sensors, ideally, each of the plurality of detection signals has a waveform of a sinusoidal curve (including a sine waveform and a cosine waveform) when the angle to be detected varies with a predetermined period. However, there are cases where the waveform of each detection signal is distorted from a sinusoidal curve. A distortion of the waveform of each detection signal may result in some error in the detected angle value. The error occurring in the detected angle value will hereinafter be referred to as angular error.

When distorted in waveform, each detection signal contains an ideal component which varies in such a manner as to trace an ideal sinusoidal curve, and an error component other than the ideal component. A detected angle value that is calculated with each detection signal consisting only of the ideal component corresponds to a true angle to be detected by the angle sensor. Such a detected angle value will hereinafter be referred to as ideal angle. Angular error is the difference between the ideal angle and any detected angle value.

The causes of distortion of the waveform of each detection signal are broadly classified into a first cause related to the rotating magnetic field generated by the magnetic field generation unit and a second cause related to the magnetic detection element. In the case of an ideal angle sensor system, when the angle to be detected varies with a predetermined period, a waveform that represents variation in the strength of a component in one direction of the rotating magnetic field at the position of each detection circuit, which will hereinafter be referred to as a field-strength waveform, is sinusoidal, and the waveform of each detection signal generated by each detection circuit is also sinusoidal. The angular error caused by the first cause is due to distortion of the field-strength waveform from a sinusoidal curve.

The angular error caused by the second cause is due to distortion of the waveform of each detection signal from a sinusoidal curve even when the field-strength waveform is sinusoidal. The angular error caused by the second cause is also experienced when, for example, the free layer of a magnetoresistance element, serving as the magnetic detection element has a magnetic anisotropy. Angular error may also be caused by the combination of the first cause and the second cause.

JP 2011-158488A describes a magnetic sensor capable of reducing the angular error caused by the first cause. The magnetic sensor includes a first detection unit and a second detection unit located at positions different from each other. The first detection unit includes a first detection circuit, a second detection circuit, and a first computation circuit for calculating a first detection angle on the basis of output signals from the first and second detection circuits. The second detection unit includes a third detection circuit, a fourth detection circuit, and a second computation circuit for calculating a second detection angle on the basis of output signals from the third and fourth detection circuits. The magnetic sensor further includes a third computation circuit for calculating a detected angle value on the basis of the first and second detection angles.

The magnetic sensor described in JP 2011-158488A requires a large number of detection circuits and computation circuits, which makes the magnetic sensor complicated in configuration.

SUMMARY OF THE INVENTION

It is an object of the present invention to provide an angle sensor system that is simple in configuration and capable of reducing an angular error associated with a rotating magnetic field generated by a magnetic field generation unit.

An angle sensor system of the present invention includes a magnetic field generation unit and an angle sensor. The magnetic field generation unit generates a rotating magnetic field whose direction at a predetermined detection position varies according to an angle to be detected. The angle sensor detects the rotating magnetic field at the detection position and generates a detected angle value having a correspondence with the angle to be detected. The rotating magnetic field at the detection position contains a first magnetic field component in a first direction, and a second magnetic field component in a second direction orthogonal to the first direction.

The angle sensor includes a first detection signal generation unit, a second detection signal generation unit, and an angle detection unit. The first detection signal generation unit generates a first detection signal having a correspondence with the cosine of an angle that the direction of the rotating magnetic field at the detection position forms with respect to the first direction. The second detection signal generation unit generates a second detection signal having a correspondence with the sine of the angle that the direction of the rotating magnetic field at the detection position forms with respect to the first direction. The angle detection unit generates the detected angle value on the basis of the first and second detection signals.

The first detection signal generation unit includes at least one first magnetic detection element. The at least one first magnetic detection element includes a first magnetic layer whose magnetization direction varies according to the direction of the rotating magnetic field at the detection position. The first magnetic layer is provided with a first magnetic anisotropy.

The second detection signal generation unit includes at least one second magnetic detection element. The at least one second magnetic detection element includes a second magnetic layer whose magnetization direction varies according to the direction of the rotating magnetic field at the detection position. The second magnetic layer is provided with a second magnetic anisotropy.

When the angle to be detected varies with a predetermined period, each of the first and second magnetic field components contains an ideal magnetic field component and a fifth harmonic magnetic field component. The ideal magnetic field component varies periodically in such a manner as to trace an ideal sinusoidal curve. The fifth harmonic magnetic field component is an error component corresponding to a fifth harmonic of the ideal magnetic field component. The fifth harmonic magnetic field component causes an error that varies with ¼ the predetermined period in the detected angle value.

Assuming that each of the first and second magnetic field components consists only of the ideal magnetic field component when the angle to be detected varies with the predetermined period, each of the first and second detection signals contains an ideal signal component and a third harmonic signal component. The ideal signal component varies periodically in such a manner as to trace an ideal sinusoidal curve. The third harmonic signal component is an error component corresponding to a third harmonic of the ideal signal component. The third harmonic signal component results from the first and second magnetic anisotropies and causes an error that varies with ¼ the predetermined period in the detected angle value.

In the angle sensor system of the present invention, the first and second magnetic anisotropies are set to allow the detected angle value to contain a reduced error that varies with ¼ the predetermined period, as compared with both of the error to be caused in the detected angle value by the fifth harmonic magnetic field component only and the error to be caused in the detected angle value by the third harmonic signal component only.

In the angle sensor system of the present invention, the error to be caused in the detected angle value by the fifth harmonic magnetic field component only and the error to be caused in the detected angle value by the third harmonic signal component only may have a phase difference of 45°.

In the angle sensor system of the present invention, both of the first and second magnetic anisotropies may be shape magnetic anisotropies. An easy axis direction established by the first magnetic anisotropy and an easy axis direction established by the second magnetic anisotropy may be orthogonal to each other.

In the angle sensor system of the present invention, when the angle to be detected varies with the predetermined period, each of the first and second magnetic field components may further contain a third harmonic magnetic field component, which is an error component corresponding to a third harmonic of the ideal magnetic field component. The third harmonic magnetic field component causes an error that varies with ½ the predetermined period in the detected angle value. The angle sensor may correct the error that the third harmonic magnetic field component causes in the detected angle value.

The angle detection unit may perform correction processing to correct the error that the third harmonic magnetic field component causes in the detected angle value. The correction processing may include performing conversion computation to convert the first and second detection signals into first and second computation signals to be used for angle computation for computing the detected angle value. The conversion computation may convert the first and second detection signals into the first and second computation signals so as to allow the detected angle value to contain a reduced error that varies with ½ the predetermined period, as compared with the case of computing the detected angle value by using the first and second detection signals in the angle computation.

Either one of the at least one first magnetic detection element and the at least one second magnetic detection element may include a magnetic layer provided with a third magnetic anisotropy. The magnetic layer provided with the third magnetic anisotropy is a layer whose magnetization direction varies according to the direction of the rotating magnetic field at the detection position. The error that the third harmonic magnetic field component causes in the detected angle value may be corrected by using the first or second magnetic anisotropy in the other of the at least one first magnetic detection element and the at least one second magnetic detection element, and the third magnetic anisotropy. The third magnetic anisotropy may be a shape magnetic anisotropy.

In the one of the at least one first magnetic detection element and the at least one second magnetic detection element, the magnetic layer provided with the third magnetic anisotropy may be other than the first or second magnetic layer. Alternatively, in the one of the at least one first magnetic detection element and the at least one second magnetic detection element, the first or second magnetic layer may be provided with the third magnetic anisotropy in addition to the first or second magnetic anisotropy.

The third magnetic anisotropy and the first or second magnetic anisotropy used to correct the error that the third harmonic magnetic field component causes in the detected angle value may establish the same easy axis direction.

In the angle sensor system of the present invention, the at least one first magnetic detection element and the at least one second magnetic detection element may each include one or more magnetoresistance elements.

In the angle sensor system of the present invention, the magnetic field generation unit may be a magnet that is rotatable about a central axis. In such a case, the detection position may be located off the central axis. The angle to be detected may correspond to the rotational position of the magnet.

In the angle sensor system of the present invention, the magnetic field generation unit may be a magnet including a plurality of pairs of N and S poles arranged alternately in the first direction. In such a case, the relative position of the magnet with respect to the detection position may be variable in the first direction. The angle to be detected may be an angle that represents the relative position of the magnet with respect to the detection position with one pitch of the magnet as 360°.

The angle sensor system of the present invention uses the first and second magnetic anisotropies to reduce the angular error occurring due to the fifth harmonic magnetic field component. The present invention thus enables reduction of the angular error associated with the rotating magnetic field generated by the magnetic field generation unit, without complexity in configuration.

Other and further objects, features and advantages of the present invention will appear more fully from the following description.

DETAILED DESCRIPTION OF THE PREFERRED EMBODIMENTS

[First Embodiment]

Figure 1:
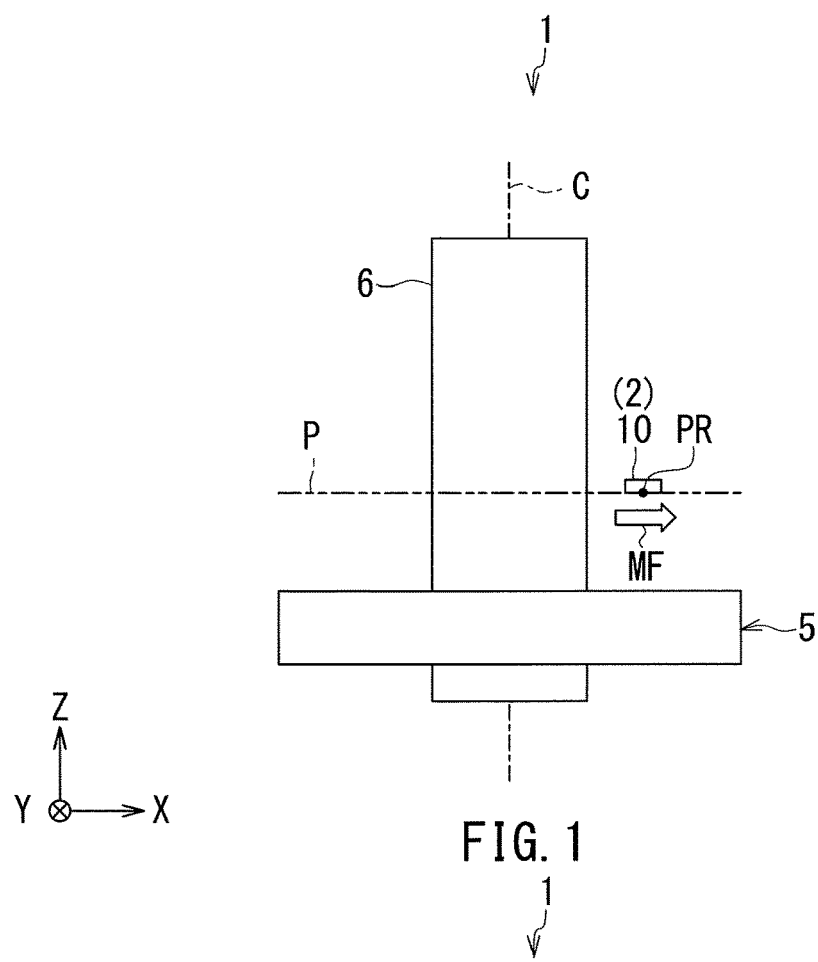
FIG. 1 is a side view illustrating the general configuration of an angle sensor system according to a first embodiment of the invention.
Figure 2:
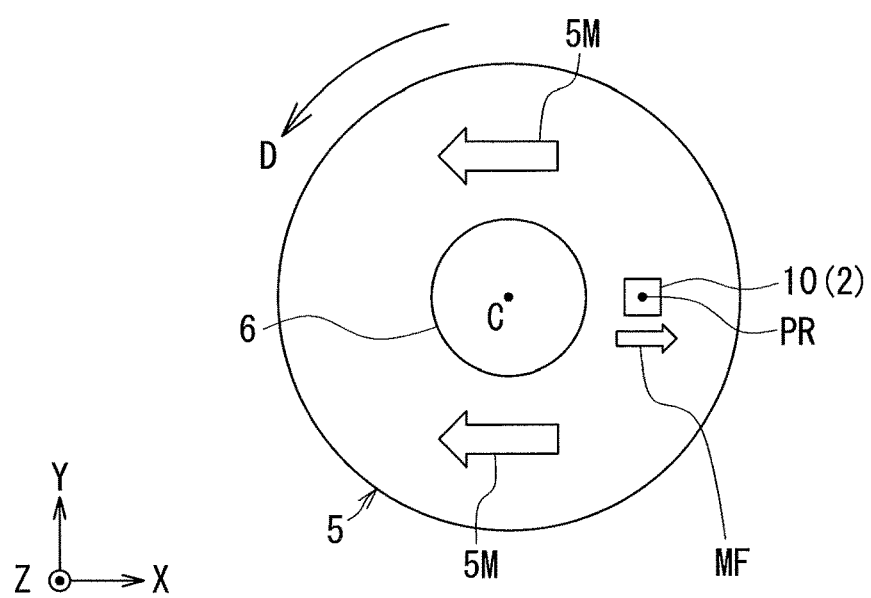
FIG. 2 is a plan view illustrating the general configuration of the angle sensor system according to the first embodiment of the invention.

Preferred embodiments of the present invention will now be described in detail with reference to the drawings. First, reference is made to FIG. 1 and FIG. 2 to describe the general configuration of an angle sensor system according to a first embodiment of the invention. FIG. 1 is a side view illustrating the general configuration of the angle sensor system according to the first embodiment. FIG. 2 is a plan view illustrating the general configuration of the angle sensor system according to the first embodiment. The angle sensor system 1 according to the first embodiment includes a magnetic field generation unit and an angle sensor 2.

The magnetic field generation unit of the present embodiment is a magnet 5 of a ring shape mounted onto a rotary shaft 6, which is an object whose rotational position is to be detected. In response to the rotation of the rotary shaft 6, the magnet 5 rotates about a central axis C in a rotational direction D. The angle to be detected in the present embodiment corresponds to the rotational position of the rotary shaft 6 and the rotational position of the magnet 5. Hereinafter, the angle to be detected will be referred to as "target angle" and represented by symbol θ.

The magnet 5 serving as the magnetic field generation unit has a magnetization in the direction indicated by arrows 5M in FIG. 2. With this magnetization, the magnet 5 generates a rotating magnetic field MF whose direction at a predetermined detection position PR varies according to the target angle θ. Hereinafter, the angle that the direction DM of the rotating magnetic field MF at the detection position PR forms with respect to a predetermined reference direction DR will be referred to as "rotating field angle" and represented by symbol θM.

The angle sensor 2 is a magnetic angle sensor, in particular. The angle sensor 2 detects the rotating magnetic field MF at the detection position PR and generates a detected angle value θs having a correspondence with the target angle θ.

The detection position PR is located in a reference plane P, which is an imaginary plane that is parallel to an end face of the magnet 5 and perpendicular to the central axis C. In the reference plane P, the direction DM of the rotating magnetic field MF rotates about the detection position PR.

The reference direction DR is located in the reference plane P and intersects the detection position PR. In the following description, the direction DM of the rotating magnetic field MF at the detection position PR refers to a direction in the reference plane P.

The angle sensor 2 includes a detection unit 10 and an angle detection unit 20. The angle detection unit 20 is not shown in FIG. 1 or FIG. 2, but shown in FIG. 4 to be described later. The detection unit 10 is situated to contact or intersect the reference plane P. The relative position of the magnet 5 with respect to the detection unit 10 varies in the rotational direction D about the central axis C.

Figure 3:
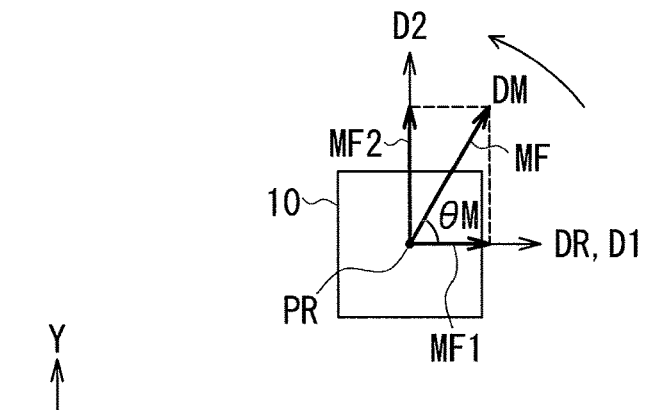
FIG. 3 is an explanatory diagram illustrating the definitions of directions and angles used in the first embodiment of the invention.

Now, the definitions of directions and angles used in the present embodiment will be described with reference to FIGS. 1 to 3. First, Z direction is the direction parallel to the central axis C shown in FIG. 1 and upward in FIG. 1. In FIGS. 2 and 3, the Z direction is out of the plane of the drawing. Next, X and Y directions are two directions that are perpendicular to the Z direction and orthogonal to each other. In FIG. 1, the X direction is rightward, and the Y direction is into the plane of the drawing. In FIGS. 2 and 3, the X direction is rightward, and the Y direction is upward. Further, −X direction is the direction opposite to the X direction, and −Y direction is the direction opposite to the Y direction.

The detection position PR is the position at which the angle sensor 2 detects the rotating magnetic field MF. The reference direction DR is the X direction. The direction DM of the rotating magnetic field MF rotates counterclockwise in FIG. 3. The target angle θ and the rotating field angle θM will be expressed in positive values when seen counterclockwise from the reference direction DR, and in negative values when seen clockwise from the reference direction DR.

A first direction D1 and a second direction D2 refer to two directions orthogonal to each other in the reference plane P. In the present embodiment, the first direction D1 is the X direction, and the second direction D2 is the Y direction.

As shown in FIG. 3, the rotating magnetic field MF at the detection position PR contains a first magnetic field component MF1 in the first direction D1 and a second magnetic field component MF2 in the second direction D2.

Figure 4:
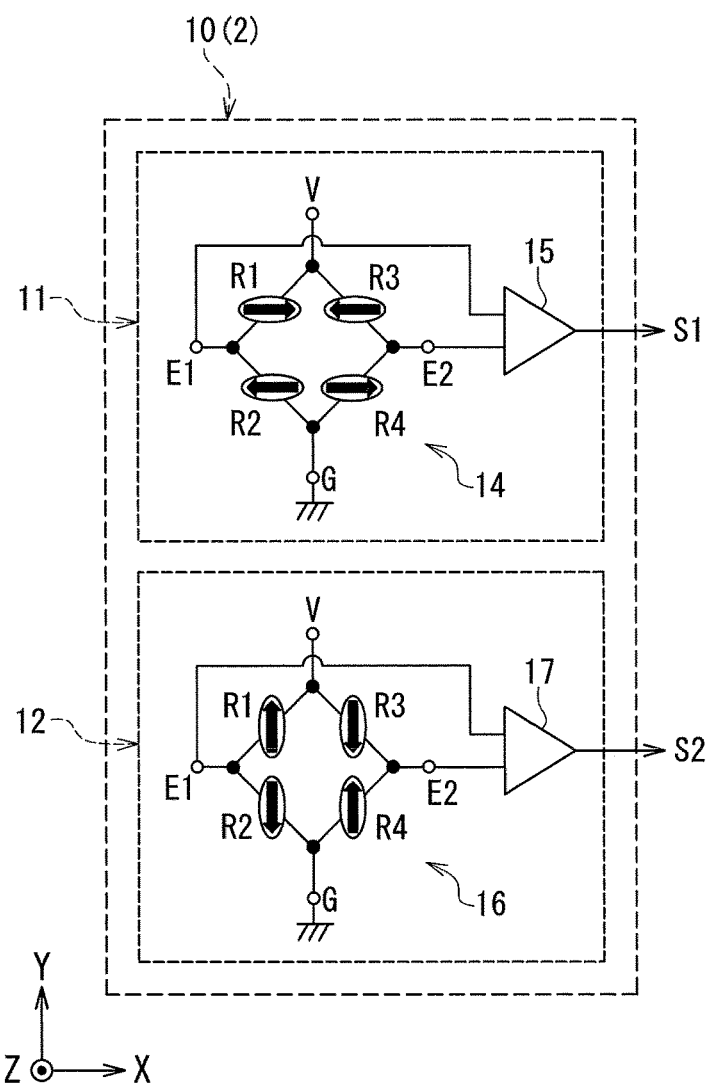
FIG. 4 is a circuit diagram illustrating a first example of configuration of a detection unit of the first embodiment of the invention.
Figure 5:
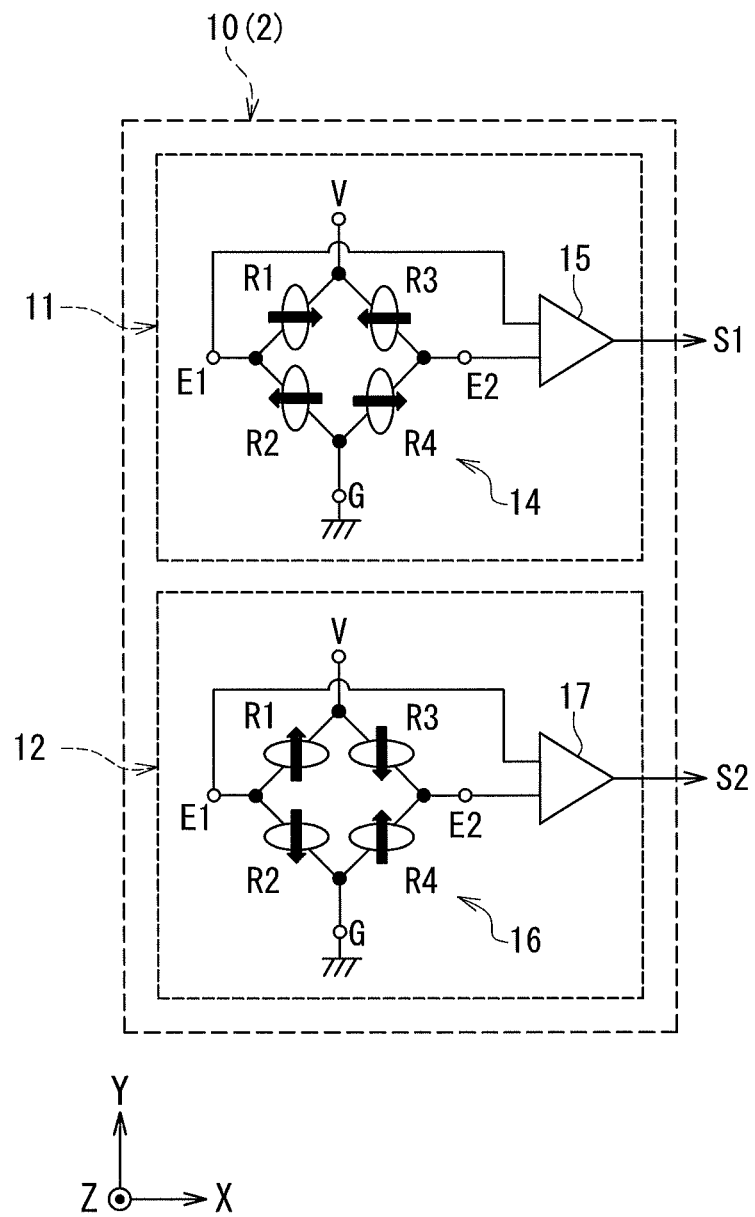
FIG. 5 is a circuit diagram illustrating a second example of configuration of the detection unit of the first embodiment of the invention.

The configuration of the detection unit 10 will now be described in detail with reference to FIG. 4 and FIG. 5. FIG. 4 is a circuit diagram illustrating a first example of configuration of the detection unit 10. FIG. 5 is a circuit diagram illustrating a second example of configuration of the detection unit 10. The detection unit 10 includes a first detection signal generation unit 11 and a second detection signal generation unit 12.

The first detection signal generation unit 11 generates a first detection signal S1 having a correspondence with the cosine of the angle that the direction DM of the rotating magnetic field MF at the detection position PR forms with respect to the first direction D1. The second detection signal generation unit 12 generates a second detection signal S2 having a correspondence with the sine of the angle that the direction DM of the rotating magnetic field MF at the detection position PR forms with respect to the first direction D1. In the present embodiment, the first direction D1 is the same direction as the reference direction DR. Thus, the angle that the direction DM of the rotating magnetic field MF at the detection position PR forms with respect to the first direction D1 is equal to the rotating field angle θM.

The first detection signal generation unit 11 includes at least one first magnetic detection element for detecting the rotating magnetic field MF. The at least one first magnetic detection element includes a first magnetic layer whose magnetization direction varies according to the direction DM of the rotating magnetic field MF at the detection position PR. The first magnetic layer is provided with a first magnetic anisotropy.

The second detection signal generation unit 12 includes at least one second magnetic detection element for detecting the rotating magnetic field MF. The at least one second magnetic detection element includes a second magnetic layer whose magnetization direction varies according to the direction DM of the rotating magnetic field MF at the detection position PR. The second magnetic layer is provided with a second magnetic anisotropy.

Both of the first and second magnetic anisotropies are shape magnetic anisotropies, for example. The easy axis direction established by the first magnetic anisotropy and the easy axis direction established by the second magnetic anisotropy are orthogonal to each other.

The at least one first magnetic detection element and the at least one second magnetic detection element may each include one or more magnetoresistance elements. The one or more magnetoresistance elements may be giant magnetoresistance (GMR) element(s), tunneling magnetoresistance (TMR) element(s), or anisotropic magnetoresistance (AMR) element(s).

When the target angle θ varies with a predetermined period to cause the direction DM of the rotating magnetic field MF to vary with the predetermined period, each of the first and second detection signals S1 and S2 varies periodically with a signal period equal to the aforementioned predetermined period. The phase of the second detection signal S2 preferably differs from that of the first detection signal S1 by 90°. However, in the light of the production accuracy of the magnetic detection element and other factors, the phase difference between the first detection signal S1 and the second detection signal S2 can be slightly different from 90°. In the following description, the first detection signal S1 and the second detection signal S2 have a phase difference of 90°.

Reference is now made to FIG. 4 and FIG. 5 to describe an example of specific configuration of the first and second detection signal generation units 11 and 12. In this example, the first detection signal generation unit 11 includes a Wheatstone bridge circuit 14 and a difference detector 15. The second detection signal generation unit 12 includes a Wheatstone bridge circuit 16 and a difference detector 17.

Each of the Wheatstone bridge circuits 14 and 16 includes four magnetic detection elements R1, R2, R3 and R4, a power supply port V, a ground port G, a first output port E1, and a second output port E2. The magnetic detection element R1 is provided between the power supply port V and the first output port E1. The magnetic detection element R2 is provided between the first output port E1 and the ground port G. The magnetic detection element R3 is provided between the power supply port V and the second output port E2. The magnetic detection element R4 is provided between the second output port E2 and the ground port G. A power supply voltage of predetermined magnitude is applied to the power supply port V. The ground port G is grounded.

Each of the magnetic detection elements R1, R2, R3 and R4 may include a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies according to the direction DM of the rotating magnetic field MF at the detection position PR, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance according to the angle that the magnetization direction of the free layer forms with respect to the magnetization direction of the magnetization pinned layer, and has a minimum resistance when the foregoing angle is 0° and a maximum resistance when the foregoing angle is 180°. In FIG. 4 and FIG. 5, the filled arrows indicate the magnetization directions of the magnetization pinned layers of the MR elements.

In the first detection signal generation unit 11, the magnetization pinned layers of the MR elements included in the magnetic detection elements R1 and R4 are magnetized in the first direction D1 (the X direction), and the magnetization pinned layers of the MR elements included in the magnetic detection elements R2 and R3 are magnetized in the opposite direction to the first direction D1. In this case, the potential difference between the output ports E1 and E2 of the Wheatstone bridge circuit 14 varies according to the cosine of the rotating field angle θM. The difference detector 15 outputs a signal corresponding to the potential difference between the output ports E1 and E2 of the Wheatstone bridge circuit 14 as the first detection signal S1. The first detection signal generation unit 11 thus generates the first detection signal S1 having a correspondence with the cosine of the rotating field angle θM.

In the second detection signal generation unit 12, the magnetization pinned layers of the MR elements included in the magnetic detection elements R1 and R4 are magnetized in the second direction D2 (the Y direction), and the magnetization pinned layers of the MR elements included in the magnetic detection elements R2 and R3 are magnetized in the opposite direction to the second direction D2. In this case, the potential difference between the output ports E1 and E2 of the Wheatstone bridge circuit 16 varies according to the sine of the rotating field angle θM. The difference detector 17 outputs a signal corresponding to the potential difference between the output ports E1 and E2 of the Wheatstone bridge circuit 16 as the second detection signal S2. The second detection signal generation unit 12 thus generates the second detection signal S2 having a correspondence with the sine of the rotating field angle θM.

In the light of the production accuracy of the MR elements and other factors, the magnetization directions of the magnetization pinned layers of the plurality of MR elements in the detection signal generation units 11 and 12 may be slightly different from the above-described directions.

Each of the magnetic detection elements R1, R2, R3, and R4 in the first detection signal generation unit 11 includes at least one MR element including a free layer provided with the first magnetic anisotropy. The free layer provided with the first magnetic anisotropy corresponds to the first magnetic layer. In the present embodiment, in particular, the free layers of all the MR elements included in the first detection signal generation unit 11 are provided with the first magnetic anisotropy.

Each of the magnetic detection elements R1, R2, R3, and R4 in the second detection signal generation unit 12 includes at least one MR element including a free layer provided with the second magnetic anisotropy. The free layer provided with the second magnetic anisotropy corresponds to the second magnetic layer. In the present embodiment, in particular, the free layers of all the MR elements included in the second detection signal generation unit 12 are provided with the second magnetic anisotropy.

Now, a description will be given of differences between the detection unit 10 of the first example shown in FIG. 4 and the detection unit 10 of the second example shown in FIG. 5. In FIG. 4 and FIG. 5, the major axis direction of the ellipses representing the magnetic detection elements R1, R2, R3 and R4 in the first detection signal generation unit 11 corresponds to the easy axis direction established by the first magnetic anisotropy. The major axis direction of the ellipses representing the magnetic detection elements R1, R2, R3 and R4 in the second detection signal generation unit 12 corresponds to the easy axis direction established by the second magnetic anisotropy.

In the first detection signal generation unit 11 of the detection unit 10 shown in FIG. 4, the easy axis direction established by the first magnetic anisotropy is parallel to the X direction. In this example, the easy axis direction established by the first magnetic anisotropy is parallel to the magnetization directions of the magnetization pined layers of the MR elements included in the magnetic detection elements R1, R2, R3 and R4 of the first detection signal generation unit 11. In the second detection signal generation unit 12 of the detection unit 10 shown in FIG. 4, the easy axis direction established by the second magnetic anisotropy is parallel to the Y direction. In this example, the easy axis direction established by the second magnetic anisotropy is parallel to the magnetization directions of the magnetization pined layers of the MR elements included in the magnetic detection elements R1, R2, R3 and R4 of the second detection signal generation unit 12.

In the first detection signal generation unit 11 of the detection unit 10 shown in FIG. 5, the easy axis direction established by the first magnetic anisotropy is parallel to the Y direction. In this example, the easy axis direction established by the first magnetic anisotropy is orthogonal to the magnetization directions of the magnetization pined layers of the MR elements included in the magnetic detection elements R1, R2, R3 and R4 of the first detection signal generation unit 11. In the second detection signal generation unit 12 of the detection unit 10 shown in FIG. 5, the easy axis direction established by the second magnetic anisotropy is parallel to the X direction. In this example, the easy axis direction established by the second magnetic anisotropy is orthogonal to the magnetization directions of the magnetization pined layers of the MR elements included in the magnetic detection elements R1, R2, R3 and R4 of the second detection signal generation unit 12.

In the present embodiment, as mentioned previously, both of the first and second magnetic anisotropies are shape magnetic anisotropies, for example. In this case, forming the MR elements into a shape that is long in one direction, such as an elliptic shape, when viewed in a direction perpendicular to the interface between the free layer and the nonmagnetic layer, allows setting the first and second magnetic anisotropies such that the longitudinal direction of the MR elements coincides with the easy axis direction.

In the light of the production accuracy of the MR elements and other factors, the easy axis directions established by the first and second magnetic anisotropies may be slightly different from the above-specified directions.

In the present embodiment, one of the first and second examples shown in FIG. 4 and FIG. 5 is selected and the magnitudes of the first and second magnetic anisotropies are determined according to error components contained in each of the first and second magnetic field components MF1 and MF2. This will be described in detail later.

Figure 6:
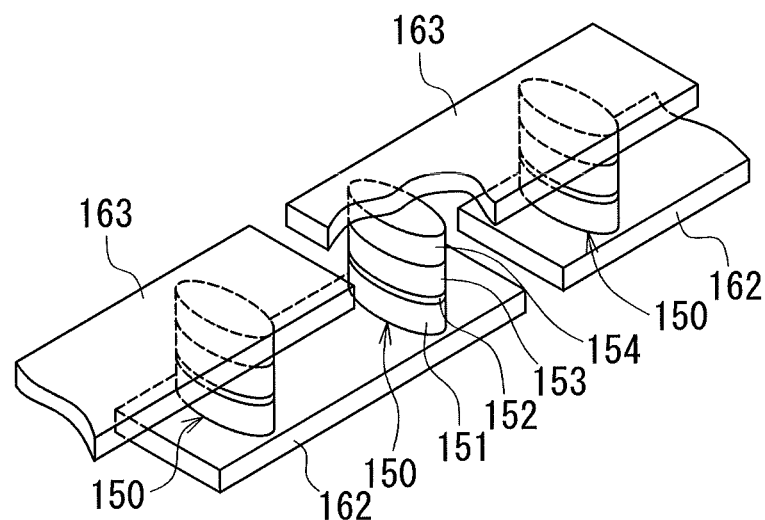
FIG. 6 is a perspective view of a portion of a magnetic detection element shown in FIG. 4.

An example configuration of the magnetic detection elements will now be described with reference to FIG. 6. FIG. 6 is a perspective view illustrating a portion of a magnetic detection element in the angle sensor 2 shown in FIG. 4 or FIG. 5. In this example, the magnetic detection element includes a plurality of lower electrodes 162, a plurality of MR elements 150 and a plurality of upper electrodes 163. The plurality of lower electrodes 162 are arranged on a substrate (not illustrated). Each of the lower electrodes 162 has a long slender shape. Every two lower electrodes 162 that are adjacent to each other in the longitudinal direction of the lower electrodes 162 have a gap therebetween. As shown in FIG. 6, MR elements 150 are provided on the top surfaces of the lower electrodes 162, near opposite ends in the longitudinal direction. Each of the MR elements 150 includes a free layer 151, a nonmagnetic layer 152, a magnetization pinned layer 153, and an antiferromagnetic layer 154 which are stacked in this order, the free layer 151 being closest to the lower electrode 162. The free layer 151 is electrically connected to the lower electrode 162. The antiferromagnetic layer 154 is formed of an antiferromagnetic material. The antiferromagnetic layer 154 is in exchange coupling with the magnetization pinned layer 153 so as to pin the magnetization direction of the magnetization pinned layer 153. The plurality of upper electrodes 163 are arranged over the plurality of MR elements 150. Each of the upper electrodes 163 has a long slender shape, and establishes electrical connection between the respective antiferromagnetic layers 154 of two adjacent MR elements 150 that are arranged on two lower electrodes 162 adjacent in the longitudinal direction of the lower electrodes 162. With such a configuration, the plurality of MR elements 150 in the magnetic detection element shown in FIG. 6 are connected in series by the plurality of lower electrodes 162 and the plurality of upper electrodes 163. It should be appreciated that the layers 151 to 154 of the MR elements 150 may be stacked in the reverse order to that shown in FIG. 6.

In the example shown in FIG. 6, in order to provide the free layer 151 with the shape magnetic anisotropy described above, each MR element 150 is shaped to be elliptic when viewed in the direction perpendicular to the interface between the free layer 151 and the nonmagnetic layer 152.

Figure 7:
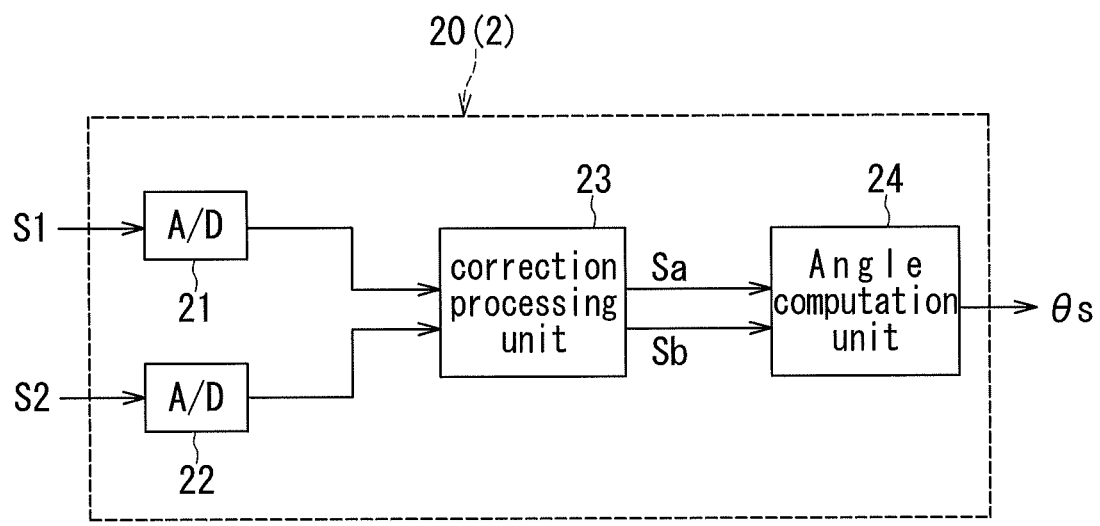
FIG. 7 is a functional block diagram illustrating the configuration of an angle detection unit of the first embodiment of the invention.

Reference is now made to FIG. 7 to describe the angle detection unit 20. The angle detection unit 20 generates the detected angle value θs on the basis of the first and second detection signals S1 and S2. The angle detection unit 20 includes analog-to-digital converters (hereinafter, "A/D converters") 21 and 22, a correction processing unit 23, and an angle computation unit 24.

The A/D converter 21 converts the first detection signal S1 into a digital signal. The A/D converter 22 converts the second detection signal S2 into a digital signal. The correction processing unit 23 performs correction processing on the digital signals converted from the first and second detection signals S1 and S2 by the A/D converters 21 and 22 to thereby generate a first computation signal Sa and a second computation signal Sb. Hereinafter, for the sake of convenience, the digital signals converted from the first and second detection signals S1 and S2 for use in the correction processing will simply be referred to as the first and second detection signals S1 and S2.

The angle computation unit 24 performs angle computation using the first and second computation signals Sa and Sb to compute the detected angle value θs. The correction processing unit 23 and the angle computation unit 24 can be implemented by an application-specific integrated circuit (ASIC) or a microcomputer, for example.

Now, a description will be given of the correction processing to be performed by the correction processing unit 23. The correction processing includes conversion computation to convert the first and second detection signals S1 and S2 into the first and second computation signals Sa and Sb for use in the angle computation to compute the detected angle value θs.

In the conversion computation, first, signals S1a and S2a corresponding to the signals S1 and S2 are generated by performing computations using functions for correcting offsets and amplitudes. To be more specific, in the correction processing, the signals S1a and S2a are generated using the functions expressed in the following Eqs. (1) and (2), respectively.

$$S1a = (S1 - S1_{off})/S1_{amp}/CP1 \tag{1}$$

$$S2a = (S2 - S1_{off})/S2_{amp} \cdot CP1 \tag{2}$$

In Eq. (1), $S1_{off}$ and $S1_{amp}$ represent the offset and the amplitude of the signal S1, respectively. In Eq. (2), $S2_{off}$ and $S2_{amp}$ represent the offset and the amplitude of the signal S2, respectively. The offset $S1_{off}$ and the amplitude $S1_{amp}$ are determined from the waveform for at least one period of the signal S1. The offset $S2_{off}$ and the amplitude $S2_{amp}$ are determined from the waveform for at least one period of the signal S2. The waveforms for at least one period of the signals S1 and S2 can be generated before shipment or use of the angle sensor system 1.

Each of Eqs. (1) and (2) contains a correction parameter CP1. The correction parameter CP1 has a value of 1 or near 1. When the correction parameter CP1 is 1, Eqs. (1) and (2) represent fundamental computations for correcting the offsets and amplitudes of the signals S1 and S2. When the correction parameter CP1 is 1, the signals S1a and S2a become equal in amplitude. When the correction parameter CP1 is other than 1, the signals S1a and S2a do not become equal in amplitude.

In the conversion computation, a first initial computation signal Sap and a second initial computation signal Sbp are then generated using the functions expressed in the following Eqs. (3) and (4), respectively.

$$Sap = S1a - S2a \tag{3}$$

$$Sbp = S1a + S2a \tag{4}$$

In the conversion computation, the first computation signal Sa and the second computation signal Sb are then generated using the functions expressed in the following Eqs. (5) and (6), respectively.

$$Sa = Sap/Sap_{amp}/CP2 \tag{5}$$

$$Sb = Sbp/Sbp_{amp} \cdot CP2 \tag{6}$$

In Eq. (5), $Sap_{amp}$ represents the amplitude of the first initial computation signal Sap. In Eq. (6), $Sbp_{amp}$ represents the amplitude of the second initial computation signal Sbp. The amplitudes $Sap_{amp}$ and $Sbp_{amp}$ are determined from the waveforms for at least one period of the first and second initial computation signals Sap and Sbp, respectively. The waveforms for at least one period of the first and second initial computation signals Sap and Sbp can be generated before shipment or use of the angle sensor system 1.

Each of Eqs. (5) and (6) contains a correction parameter CP2. The correction parameter CP2 has a value of 1 or near 1.

When both of the correction parameters CP1 and CP2 are 1, Eqs. (1) to (6) represent fundamental computations for making the phase difference between the first and second computation signals Sa and Sb be 90° and making the amplitudes of the first and second computation signals Sa and Sb equal. When the correction parameter CP1 is other than 1, the phase difference between the first and second computation signals Sa and Sb becomes near 90°, although not exactly 90°. When the correction parameter CP2 is other than 1, the first and second computation signals Sa and Sb do not become equal in amplitude. A method for determining the correction parameters CP1 and CP2 will be described in detail later.

Now, the angle computation to be performed by the angle computation unit 24 will be described. In the angle computation, the detected angle value θs is computed from the following Eq. (7) using the first and second computation signals Sa and Sb. In Eq. (7), "atan" represents arctangent.

$$\theta s = atan(Sb/Sa) - \alpha \quad (7)$$

In Eq. (7), α represents the phase difference between the detected angle value θs and the angle determined by the computation of atan(Sb/Sa).

For θs within the range of 0° to less than 360°, Eq. (7) yields two solutions that are 180° different in value. Which of the two solutions for θs in Eq. (7) is the true value of θs can be determined from the combination of positive and negative signs of Sa and Sb. The angle computation unit 24 determines θs within the range of 0° to less than 360° using Eq. (7) and the foregoing determination on the combination of positive and negative signs of Sa and Sb.

The function and effects of the angle sensor system 1 according to the present embodiment will now be described. In the present embodiment, angular errors that can occur in the detected angle value θs include one associated with the rotating magnetic field MF and one associated with the angle sensor 2. In the present embodiment, the angular error associated with the angle sensor 2 results mainly from the first and second magnetic anisotropies. Note that the angular error corresponds to the detected angle value θs minus the target angle θ.

First, a description will be given of the angular error associated with the rotating magnetic field MF only. When the target angle θ varies with a predetermined period, each of the first and second magnetic field components MF1 and MF2 of the rotating magnetic field MF contains an ideal magnetic field component, a third harmonic magnetic field component, and a fifth harmonic magnetic field component. The ideal magnetic field component varies periodically in such a manner as to trace an ideal sinusoidal curve. The third harmonic magnetic field component is an error component corresponding to the third harmonic of the ideal magnetic field component. The fifth harmonic magnetic field component is an error component corresponding to the fifth harmonic of the ideal magnetic field component. The ideal magnetic field component, the third harmonic magnetic field component, and the fifth harmonic magnetic field component of the first magnetic field component MF1 will be represented by MF10, MF1a, and MF1b, respectively. The ideal magnetic field component, the third harmonic magnetic field component, and the fifth harmonic magnetic field component of the second magnetic field component MF2 will be represented by MF20, MF2a, and MF2b, respectively.

The third harmonic magnetic field components MF1a and MF2a of the first and second magnetic field components MF1 and MF2 cause an angular error Ea in the detected angle value θs, the angular error Ea varying with ½ the predetermined period. The fifth harmonic magnetic field components MF1b and MF2b of the first and second magnetic field components MF1 and MF2 cause an angular error Eb in the detected angle value θs, the angular error Eb varying with ¼ the predetermined period.

In the present embodiment, each of the first and second magnetic field components MF1 and MF2 contains the third and fifth harmonic magnetic field components. As a result, the angular error Ea and the angular error Eb are combined into an angular error Eab in the detected angle value θs.

Figure 8:
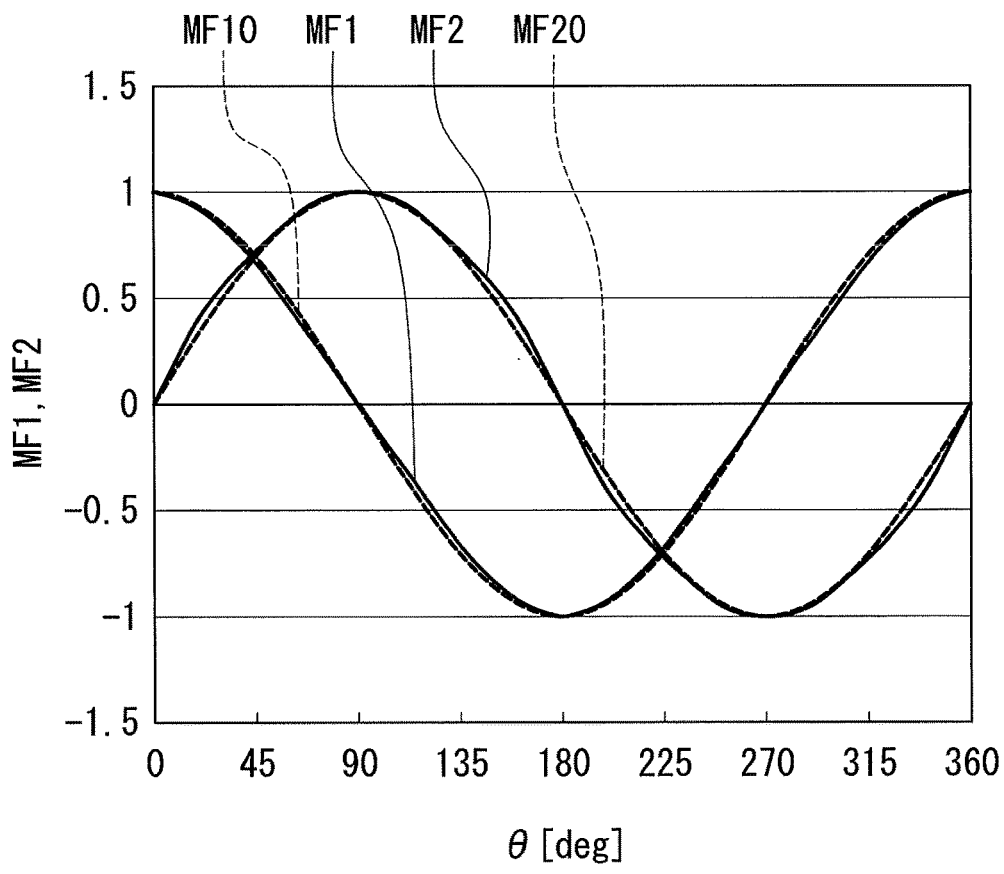
FIG. 8 is a waveform diagram illustrating an example of waveforms of first and second magnetic field components in the first embodiment of the invention.

FIG. 8 illustrates an example of waveforms of the first and second magnetic field components MF1 and MF2. In FIG. 8, the horizontal axis represents the target angle θ, and the vertical axis represents the first and second magnetic field components MF1 and MF2. The vertical axis of FIG. 8 is in arbitrary units with the maximum value of the ideal magnetic field components MF10 and MF 20 of the first and second magnetic field components MF1 and MF2 as 1. In FIG. 8, the curve MF1 represents the waveform of the first magnetic field component MF1, and the curve MF2 represents the waveform of the second magnetic field component MF2. The curve MF10 represents the waveform of the ideal magnetic field component of the first magnetic field component MF1, and the curve MF20 represents the waveform of the ideal magnetic field component of the second magnetic field component MF2.

Figure 9:
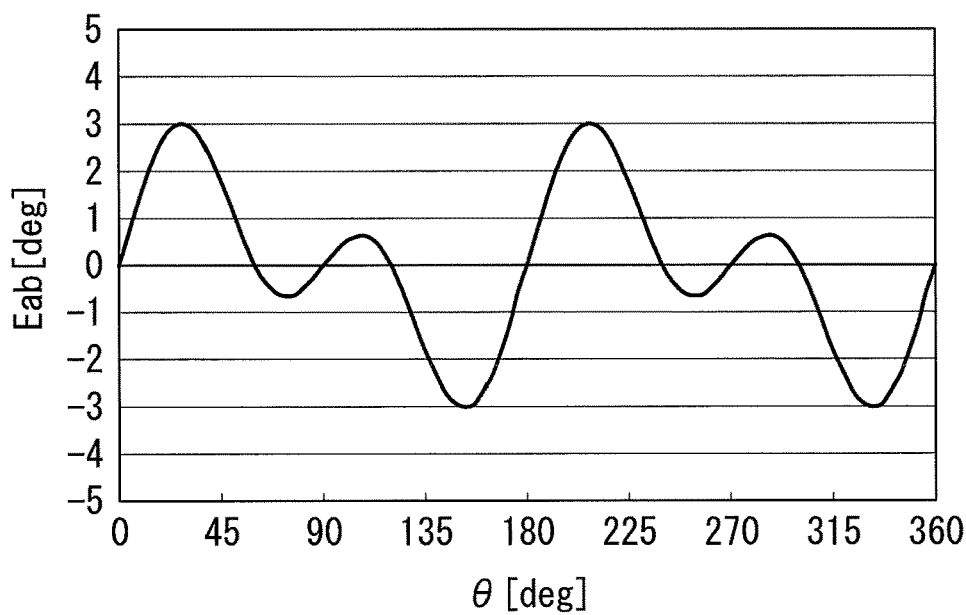
FIG. 9 is a waveform diagram illustrating the waveform of an angular error resulting from the first and second magnetic field components shown in FIG. 8.

FIG. 9 illustrates the waveform of the angular error Eab resulting from the first and second magnetic field components MF1 and MF2 shown in FIG. 8. In FIG. 9, the horizontal axis represents the target angle θ, and the vertical axis represents the angular error Eab.

Figure 10:
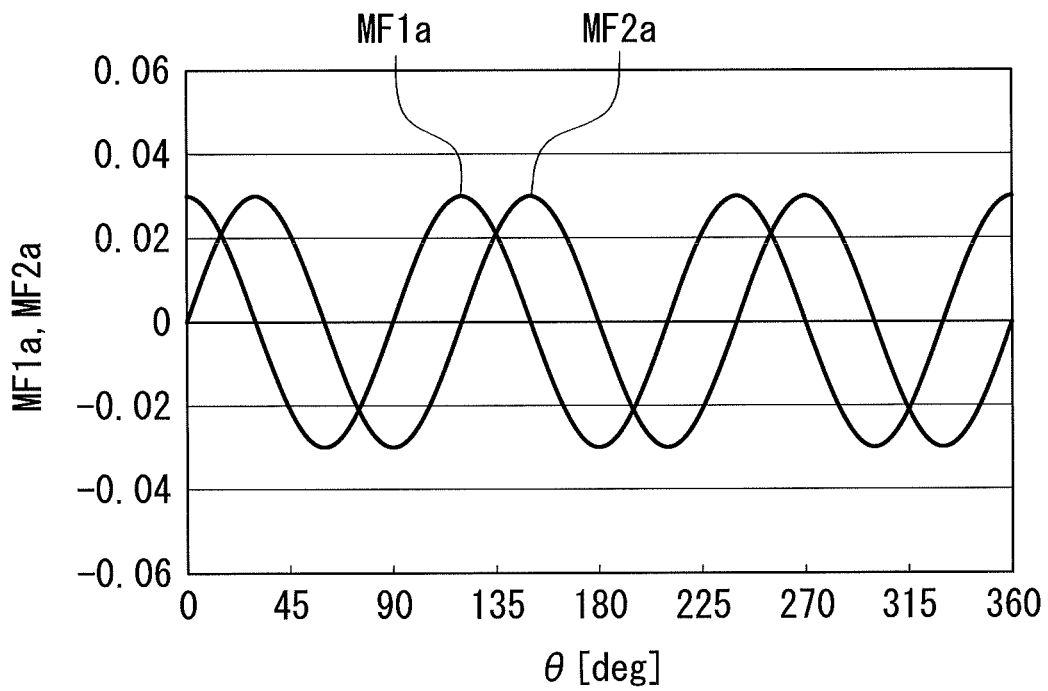
FIG. 10 is a waveform diagram illustrating waveforms of respective third harmonic magnetic field components of the first and second magnetic field components shown in FIG. 8.

FIG. 10 illustrates the waveforms of the third harmonic magnetic field components MF1a and MF2a of the first and second magnetic field components MF1 and MF2 shown in FIG. 8. In FIG. 10, the horizontal axis represents the target angle θ, and the vertical axis represents the third harmonic magnetic field components MF1a and MF2a. The vertical axis of FIG. 10 is in arbitrary units with the maximum value of the ideal magnetic field components MF10 and MF20 of the first and second magnetic field components MF1 and MF2 as 1. In FIG. 10, the curve MF1a represents the waveform of the third harmonic magnetic field component MF1a, and the curve MF2a represents the waveform of the third harmonic magnetic field component MF2a.

Figure 11:
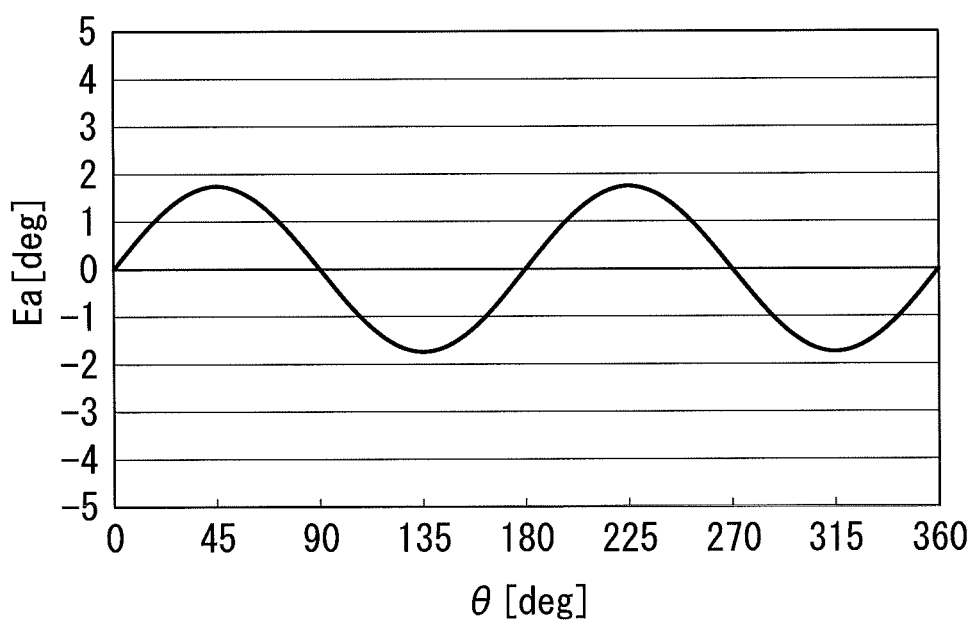
FIG. 11 is a waveform diagram illustrating the waveform of an angular error resulting only from the third harmonic magnetic field components shown in FIG. 10.

FIG. 11 illustrates the waveform of the angular error Ea resulting only from the third harmonic magnetic field components MF1a and MF2a of the first and second magnetic field components MF1 and MF2 shown in FIG. 10. In FIG. 11, the horizontal axis represents the target angle θ, and the vertical axis represents the angular error Ea.

Figure 12:
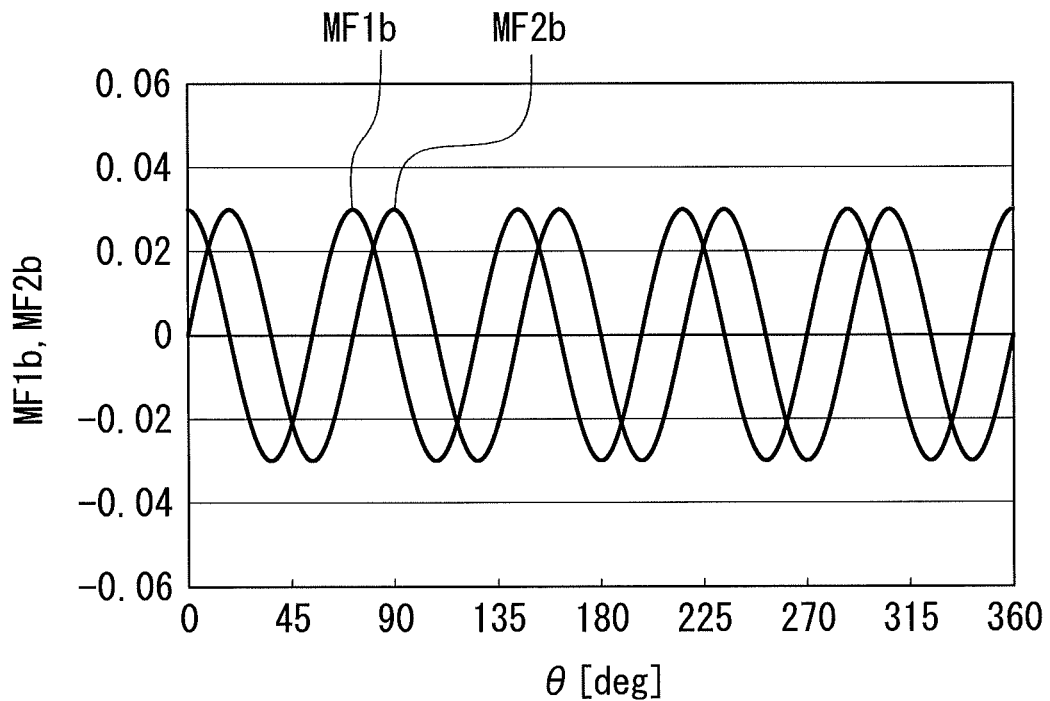
FIG. 12 is a waveform diagram illustrating waveforms of respective fifth harmonic magnetic field components of the first and second magnetic field components shown in FIG. 8.

FIG. 12 illustrates the waveforms of the fifth harmonic magnetic field components MF1b and MF2b of the first and second magnetic field components MF1 and MF2 shown in FIG. 8. In FIG. 12, the horizontal axis represents the target angle θ, and the vertical axis represents the fifth harmonic magnetic field components MF1b and MF2b. The vertical axis of FIG. 12 is in arbitrary units with the maximum value of the ideal magnetic field components MF10 and MF20 of the first and second magnetic field components MF1 and MF2 as 1. In FIG. 12, the curve MF1b represents the waveform of the fifth harmonic magnetic field component MF1b, and the curve MF2b represents the waveform of the fifth harmonic magnetic field component MF2b.

Figure 13:
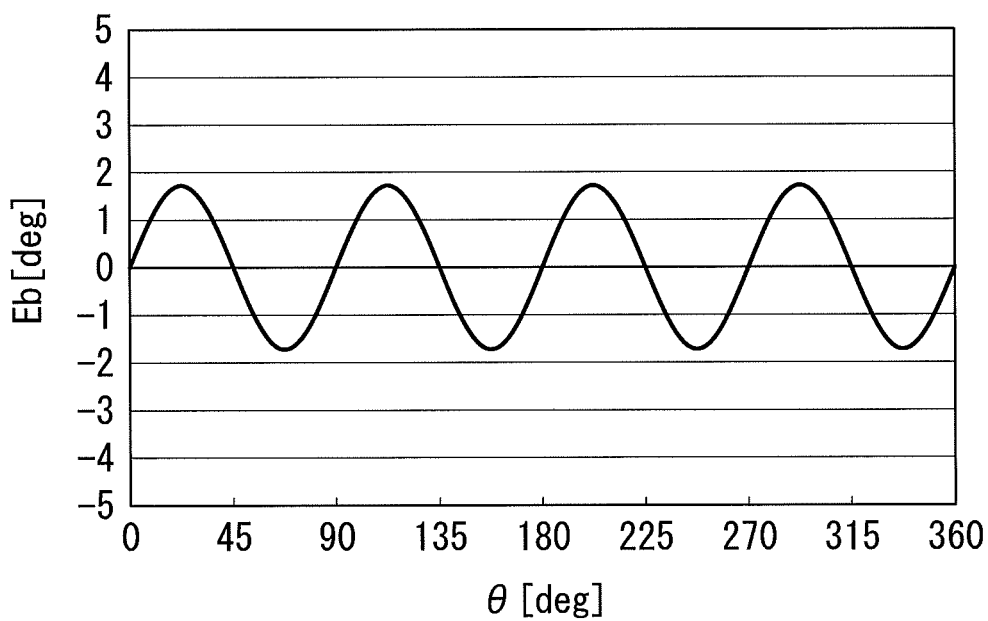
FIG. 13 is a waveform diagram illustrating the waveform of an angular error resulting only from the fifth harmonic magnetic field components shown in FIG. 12.

FIG. 13 illustrates the waveform of the angular error Eb resulting only from the fifth harmonic magnetic field components MF1b and MF2b of the first and second magnetic field components MF1 and MF2 shown in FIG. 12. In FIG. 13, the horizontal axis represents the target angle θ, and the vertical axis represents the angular error Eb.

The waveform of the ideal magnetic field component MF10 of the first magnetic field component MF1 shown in FIG. 8 can be represented by $\cos\theta$, and the waveform of the ideal magnetic field component MF20 of the second magnetic field component MF2 shown in FIG. 8 can be represented by $\sin\theta$.

The waveform of the third harmonic magnetic field component MF1$a$ of the first magnetic field component MF1 shown in FIG. 10 can be represented by $A_1 \cdot \cos 3\theta$, and the waveform of the third harmonic magnetic field component MF2$a$ of the second magnetic field component MF2 shown in FIG. 10 can be represented by $A_1 \cdot \sin 3\theta$. Here, $A_1$ is a real number. In the example shown in FIG. 10, $A_1$ is a positive value.

The waveform of the fifth harmonic magnetic field component MF1$b$ of the first magnetic field component MF1 shown in FIG. 12 can be represented by $B_1 \cdot \cos 5\theta$, and the waveform of the fifth harmonic magnetic field component MF2$b$ of the second magnetic field component MF2 shown in FIG. 12 can be represented by $B_1 \cdot \sin 5\theta$. Here, $B_1$ is a real number. In the example shown in FIG. 12, $B_1$ is a positive value.

Assuming that the angular error Eab is the only angular error occurring in the detected angle value θs, the first and second detection signals S1 and S2 can be represented by the following Eqs. (8) and (9), respectively.

$$S1 = \cos\theta + A_1 \cdot \cos 3\theta + B_1 \cdot \cos 5\theta \quad (8)$$

$$S2 = \sin\theta + A_1 \cdot \sin 3\theta + B_1 \cdot \sin 5\theta \quad (9)$$

Next, a description will be given of an angular error occurring in the detected angle value θs due to the first and second magnetic anisotropies. First, assume that the first and second magnetic field components MF1 and MF2 consist only of the ideal magnetic field components MF10 and MF20, respectively, when the target angle θ varies with a predetermined period. In such a case, each of the first and second detection signals S1 and S2 contains an ideal signal component and a third harmonic signal component. The ideal signal component varies periodically in such a manner as to trace an ideal sinusoidal curve. The third harmonic signal component is an error component corresponding to the third harmonic of the ideal signal component. The ideal signal components of the first and second detection signals S1 and S2 will be represented by S10 and S20, respectively. The third harmonic signal components of the first and second detection signals S1 and S2 result from the first and second magnetic anisotropies, respectively. The third harmonic signal components of the first and second detection signals S1 and S2 cause an angular error Ec in the detected angle value θs, the angular error Ec varying with ¼ the predetermined period.

Figure 14:
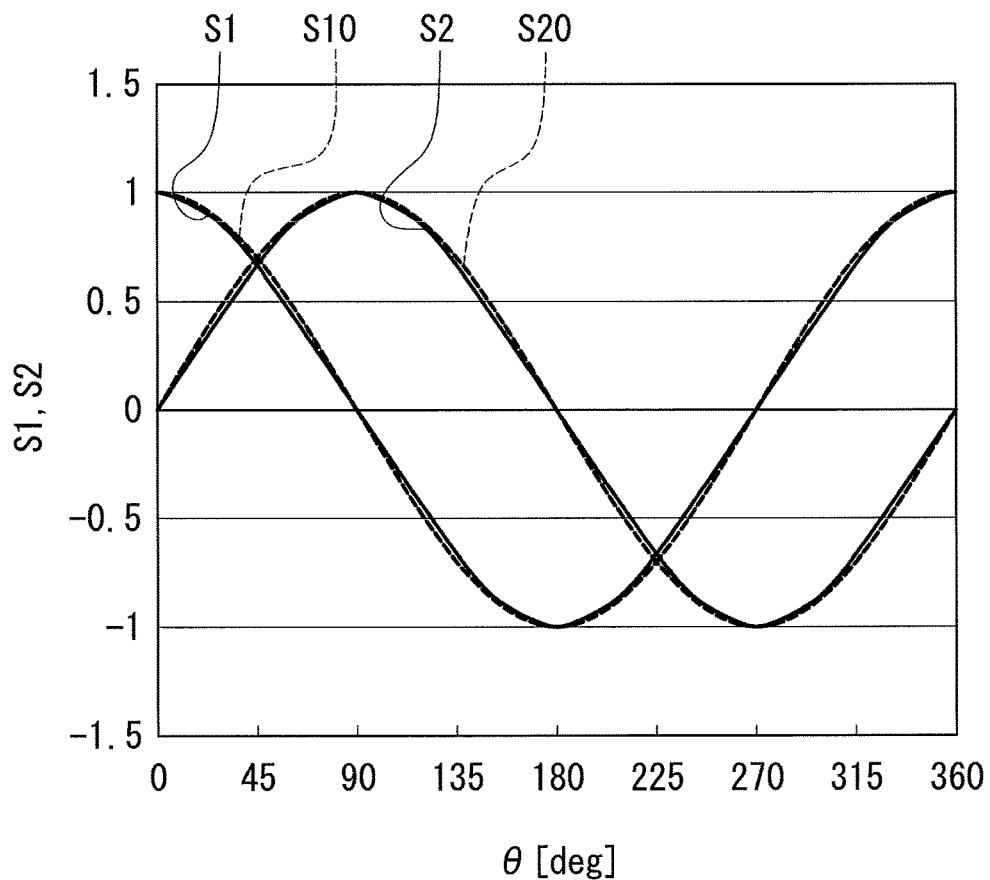
FIG. 14 is a waveform diagram illustrating an example of waveforms of first and second detection signals obtained with each of the first and second magnetic field components consisting only of an ideal magnetic field component in the first embodiment of the invention.

FIG. 14 illustrates an example of waveforms of the first and second detection signals S1 and S2 obtained on the assumption that the first and second magnetic field components MF1 and MF2 consist only of the ideal magnetic field components MF10 and MF20, respectively. In FIG. 14, the horizontal axis represents the target angle θ, and the vertical axis represents the first and second detection signals S1 and S2. In FIG. 14, the curve S1 represents the waveform of the first detection signal S1, and the curve S2 represents the waveform of the second detection signal S2. The curve S10 represents the waveform of the ideal signal component S10 of the first detection signal S1, and the curve S20 represents the waveform of the ideal signal component S20 of the second detection signal S2.

Figure 15:
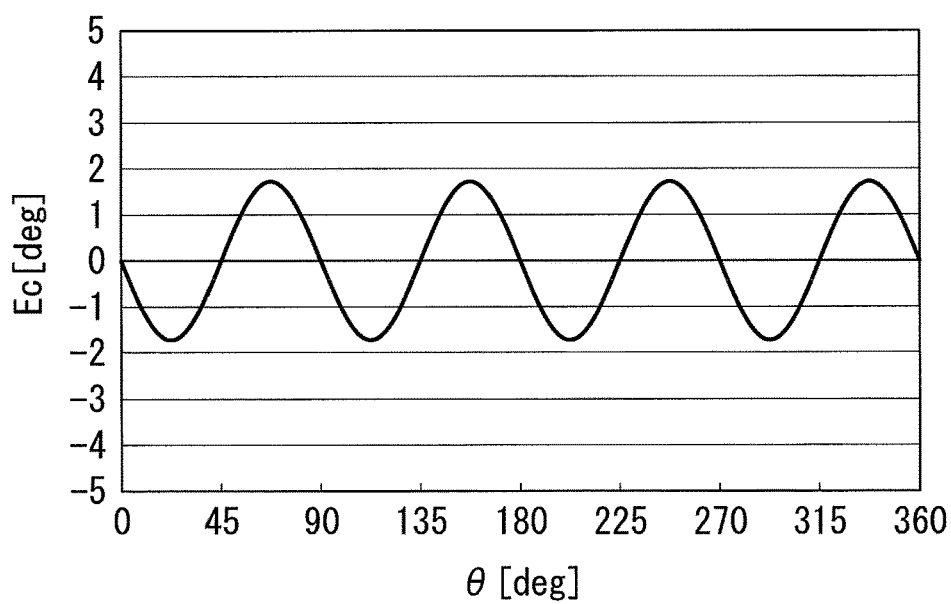
FIG. 15 is a waveform diagram illustrating the waveform of an angular error resulting only from respective third harmonic signal components of the first and second detection signals shown in FIG. 14.

FIG. 15 illustrates the waveform of the angular error Ec, which results only from the third harmonic signal components of the first and second detection signals S1 and S2 shown in FIG. 14. In FIG. 15, the horizontal axis represents the target angle θ, and the vertical axis represents the angular error Ec.

The waveform of the ideal signal component S10 of the first detection signal S1 shown in FIG. 14 can be represented by $\cos\theta$, and the waveform of the ideal signal component S20 of the second detection signal S2 shown in FIG. 14 can be represented by $\sin\theta$. The third harmonic signal component of the first detection signal S1 shown in FIG. 14 can be represented by $C_1 \cdot \cos 3\theta$, and the third harmonic signal component of the second detection signal S2 shown in FIG. 14 can be represented by $-C_1 \cdot \sin 3\theta$. Here, $C_1$ is a real number. In the example shown in FIG. 14, $C_1$ is a positive value.

Assuming that the angular error Ec is the only angular error occurring in the detected angle value θs, the first and second detection signals S1 and S2 can be represented by the following Eqs. (10) and (11), respectively.

$$S1 = \cos\theta + C_1 \cdot \cos 3\theta \quad (10)$$

$$S2 = \sin\theta - C_1 \cdot \sin 3\theta \quad (11)$$

As shown in FIG. 13, the angular error Eb resulting only from the fifth harmonic magnetic field components MF1$b$ and MF2$b$ of the first and second magnetic field components MF1 and MF2 varies with ¼ the predetermined period. As shown in FIG. 15, the angular error Ec resulting only from the third harmonic signal components of the first and second detection signals S1 and S2 also varies with ¼ the predetermined period. When $C_1$ and $B_1$ have the same positive or negative sign, the angular error Eb and the angular error Ec have a phase difference of 45°. In particular, when $C_1$ and $B_1$ are equal to each other, the angular error Eb and the angular error Ec have a phase difference of 45° and have the same amplitude. When the angular error Eb and the angular error Ec have such a relationship, any angular error that varies with ¼ the predetermined period can be completely reduced to 0, in theory, in the detected angle value θs.

The positive or negative sign of $C_1$ can be changed by changing the easy axis directions to be established by the first and second magnetic anisotropies. For example, the configuration shown in FIG. 4 makes $C_1$ a negative value, and the configuration shown in FIG. 5 makes $C_1$ a positive value. The absolute value of $C_1$ can be changed by changing the magnitudes of the first and second magnetic anisotropies.

The present embodiment takes advantage of the above-described characteristic to reduce the the angular error Eb resulting from the fifth harmonic magnetic field components MF1$b$ and MF2$b$ of the first and second magnetic field components MF1 and MF2, using the first and second magnetic anisotropies as follows. Specifically, in the present embodiment, the first and second magnetic anisotropies are set to allow the detected angle value θs to contain a reduced angular error that varies with ¼ the predetermined period, as compared with both of the angular error Eb and the angular error Ec.

According to the present embodiment, if all of the third and fifth harmonic magnetic field components MF1$a$, MF2$a$, MF1$b$ and MF2$b$ of the first and second magnetic field components MF1 and MF2 and the third harmonic signal components of the first and second detection signals S1 and S2 are taken into consideration, the first and second detection signals S1 and S2 can be represented by the following Eqs. (12) and (13), respectively.

$$S1 = \cos\theta + A_1 \cdot \cos 3\theta + B_1 \cdot \cos 5\theta + C_1 \cdot \cos 3\theta \quad (12)$$

$$S2 = \sin\theta + A_1 \cdot \sin 3\theta + B_1 \cdot \sin 5\theta - C_1 \cdot \sin 3\theta \quad (13)$$

Here, consider a case where the detected angle value θs is computed by performing angle computation defined by the following Eq. (14) using the first and second detection signals S1 and S2 given by Eqs. (12) and (13).

$$\theta s = \operatorname{atan}(S2/S1) \quad (14)$$

Figure 16:
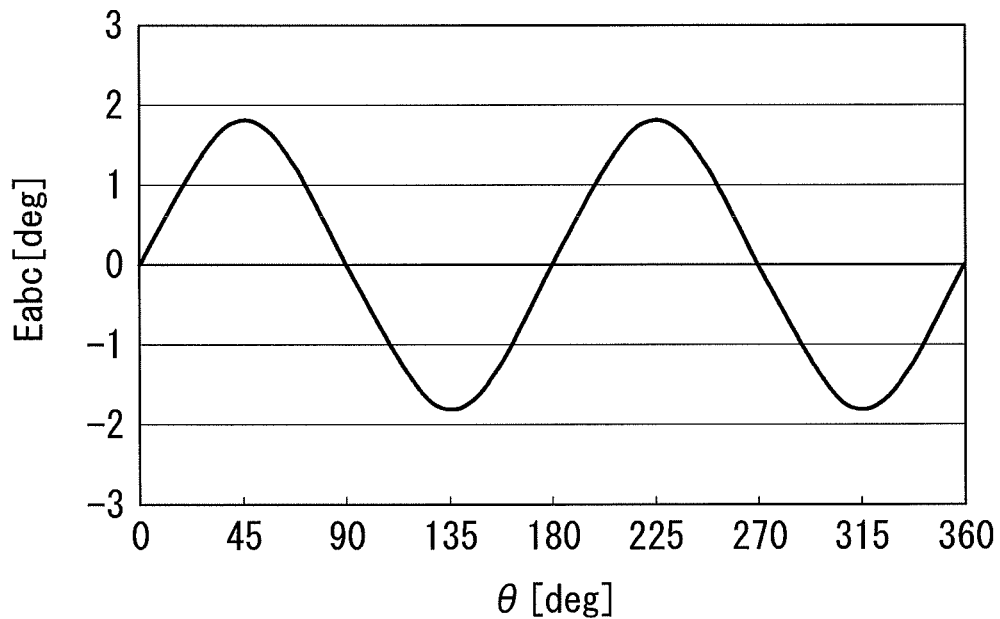
FIG. 16 is a waveform diagram illustrating an example waveform of an angular error occurring in a detected angle value obtained by performing angle computation using the first and second detection signals in the first embodiment of the invention.

An angular error to occur in the detected angle value θs in such a case will be represented by symbol Eabc. FIG. 16 illustrates an example waveform of the angular error Eabc. In FIG. 16, the horizontal axis represents the target angle θ, and the vertical axis represents the angular error Eabc. In this example, $C_1 = B_1$.

In the angular error Eabc shown in FIG. 16, the angular error component varying with ¼ the predetermined period is smaller than both of the angular error Eb shown in FIG. 13 and the angular error Ec shown in FIG. 15. This shows that the present embodiment enables reducing the angular error Eb resulting from the fifth harmonic magnetic field components MF1b and MF2b of the first and second magnetic field components MF1 and MF2 by using the first and second magnetic anisotropies.

Now, an example method for determining $C_1$ and the easy axis directions and the magnitudes of the first and second magnetic anisotropies will be described. First, the waveform of the angular error Eb is determined by $B_1$. $B_1$ is thus obtainable from the waveform of the angular error Eb.

In order for the detected angle value θs to contain a reduced angular error that varies with ¼ the predetermined period as compared with both of the angular error Eb and the angular error Ec, $C_1$ is determined so as to have the same positive or negative sign as $B_1$, and to make the absolute value of $(B_1 - C_1)$ smaller than the absolute value of $B_1$. The smaller the absolute value of $(B_1 - C_1)$ is, the more preferable it is. The absolute value of $(B_1 - C_1)$ is preferably smaller than or equal to ½ the absolute value of $B_1$.

As mentioned previously, the positive or negative sign of $C_1$ can be changed by changing the easy axis directions to be established by the first and second magnetic anisotropies. The absolute value of $C_1$ has relation to the magnitudes of the first and second magnetic anisotropies. By obtaining, in advance, the relationships between $C_1$ and the easy axis directions and the magnitudes of the first and second magnetic anisotropies, it is possible to determine the easy axis directions and the magnitudes of the first and second magnetic anisotropies on the basis of the obtained relationships to achieve a desired value of $C_1$.

When the first and second magnetic field components MF1 and MF2 contain the third harmonic magnetic field components MF1a and MF2a, respectively, computing the detected angle value θs by performing angle computation using the first and second detection signals S1 and S2 results in the occurrence of the angular error Eabc in the detected angle value θs. As shown in FIG. 16, the angular error Eabc contains an angular error component varying with ½ the predetermined period. The angular error component varying with ½ the predetermined period corresponds to the error that the third harmonic magnetic field components MF1a and MF2a cause in the detected angle value θs. This angular error component will hereinafter be referred to as "magnetic-field-related second-order angular error".

In the present embodiment, the correction processing performed by the correction processing unit 23 shown in FIG. 7 corrects the magnetic-field-related second-order angular error. Note that to correct the magnetic-field-related second-order angular error is to reduce the angular error component varying with ½ the predetermined period in the detected angle value θs.

Now, the relationships between the magnetic-field-related second-order angular error and the correction parameters CP1 and CP2 will be described. The magnetic-field-related second-order angular error contains a first component and a second component. The first component and the second component have a phase difference of 45°. The amplitude of the first component varies depending on the value of the correction parameter CP1. The first component can thus be reduced by adjusting the value of the correction parameter CP1 in accordance with the amplitude of the first component. The amplitude of the second component varies depending on the value of the correction parameter CP2. The second component can thus be reduced by adjusting the value of the correction parameter CP2 in accordance with the amplitude of the second component. The amplitudes of the first and second components can be obtained by, for example, applying a Fourier transform to the magnetic-field-related second-order angular error.

Figure 17:
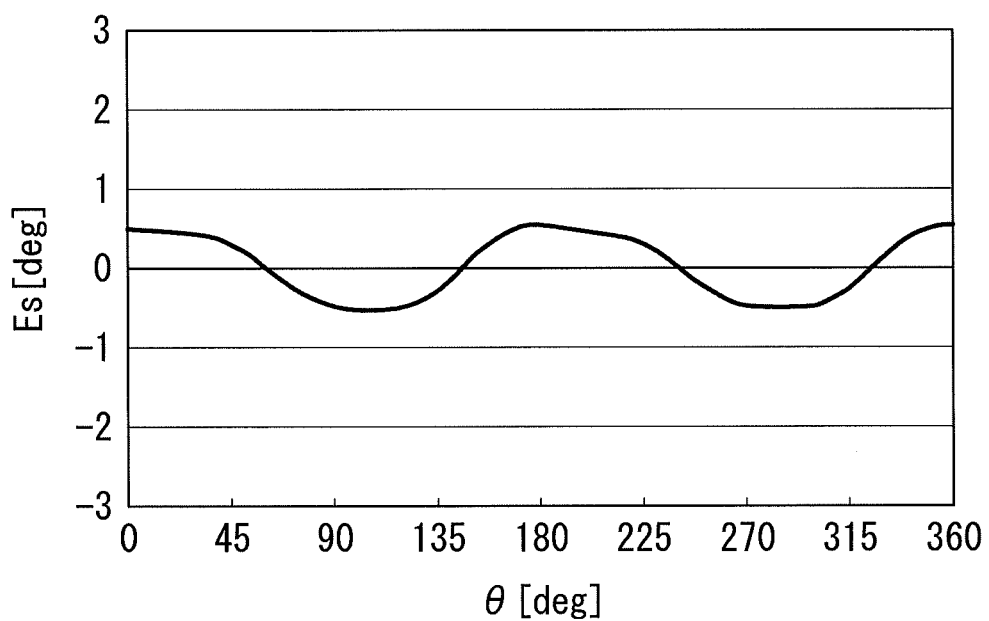
FIG. 17 is a waveform diagram illustrating an example waveform of an angular error occurring in a detected angle value obtained by performing angle computation using first and second computation signals in the first embodiment of the invention.

Now, let Es represent the angular error of the detected angle value θs when computed by the angle computation unit 24 using the first and second computation signals Sa and Sb outputted from the correction processing unit 23. FIG. 17 illustrates an example waveform of the angular error Es. This example corresponds to a case where the correction processing has been performed with the correction parameter CP1 set at 0.92 and the correction parameter CP2 set at 1. In FIG. 17, the horizontal axis represents the target angle θ, and the vertical axis represents the angular error Es. As shown in FIG. 17, the angular error Es is sufficiently smaller than the angular error Eab shown in FIG. 9, and also smaller than the angular error Eabc shown in FIG. 16.

From the foregoing, the present embodiment enables reduction of the angular error associated with the rotating magnetic field MF generated by the magnetic field generation unit. In the present embodiment, the angle sensor 2 does not require a plurality of pairs of detection signal generation units 11 and 12, but requires only one pair of detection signal generation units 11 and 12. The present embodiment thus enables reduction of the angular error associated with the rotating magnetic field MF generated by the magnetic field generation unit, without complexity in configuration.

[Second Embodiment]

Figure 18:
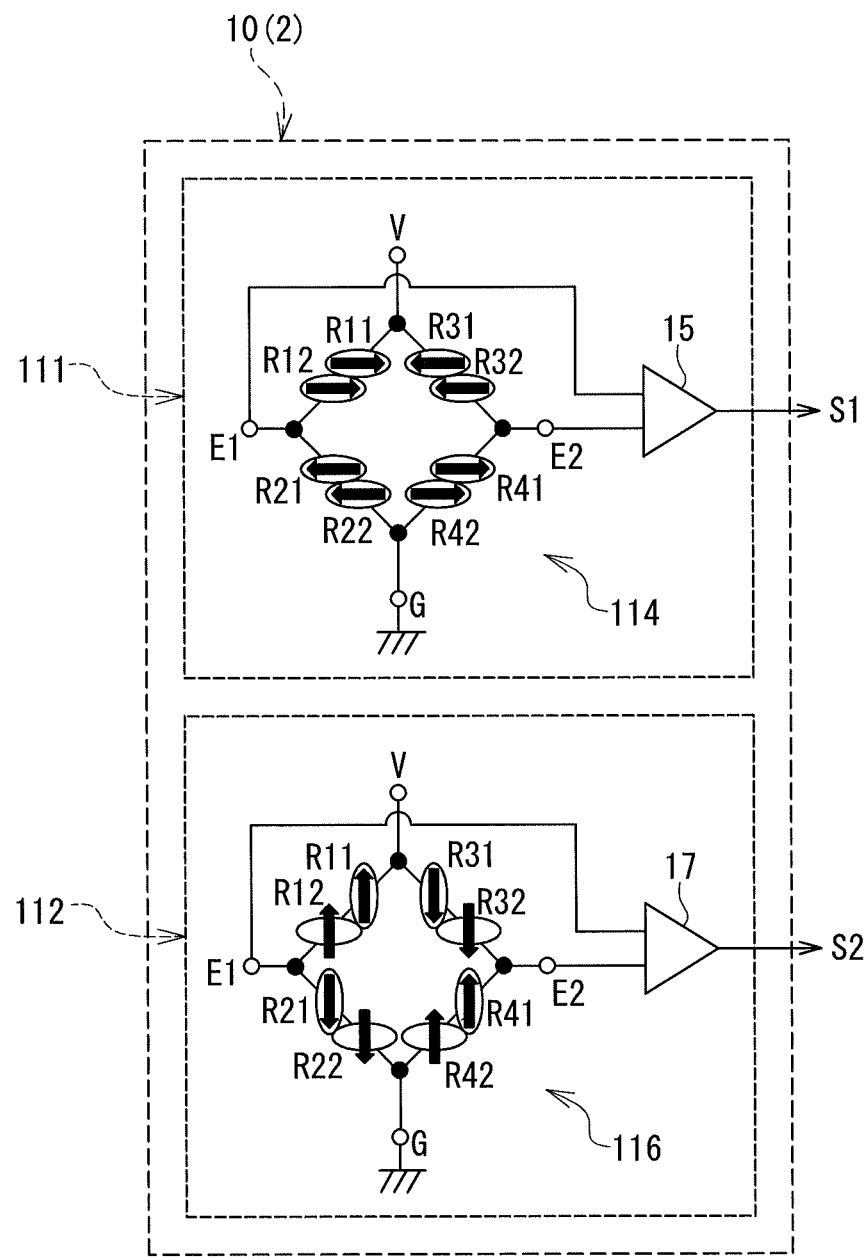
FIG. 18 is a circuit diagram illustrating a first example of configuration of a detection unit of a second embodiment of the invention.
Figure 19:
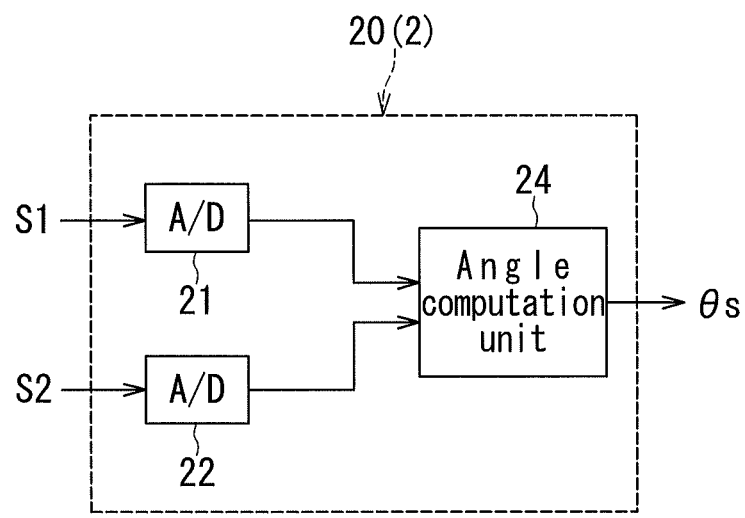
FIG. 19 is a functional block diagram illustrating the configuration of an angle detection unit of the second embodiment of the invention.

A second embodiment of the present invention will now be described. FIG. 18 is a circuit diagram illustrating a first example of configuration of the detection unit of the second embodiment. FIG. 19 is a functional block diagram illustrating the configuration of the angle detection unit of the second embodiment. In the angle sensor system 1 according to the second embodiment, the angle sensor 2 has a different configuration than that in the first embodiment.

The detection unit 10 of the angle sensor 2 of the present embodiment includes a first detection signal generation unit 111 and a second detection signal generation unit 112, in place of the first detection signal generation unit 11 and the second detection signal generation unit 12 of the first embodiment.

The first detection signal generation unit 111 includes at least one first magnetic detection element. The at least one first magnetic detection element includes a first magnetic layer. The first magnetic layer is provided with a first magnetic anisotropy.

The second detection signal generation unit 112 includes at least one second magnetic detection element. The at least one second magnetic detection element includes a second magnetic layer. The second magnetic layer is provided with a second magnetic anisotropy.

Both of the first and second magnetic anisotropies are shape magnetic anisotropies, for example. The easy axis direction established by the first magnetic anisotropy and the easy axis direction established by the second magnetic anisotropy are orthogonal to each other.

In the present embodiment, either one of the at least one first magnetic detection element and the at least one second magnetic detection element includes a magnetic layer provided with a third magnetic anisotropy. The magnetic layer provided with the third magnetic anisotropy is a layer whose magnetization direction varies according to the direction DM of the rotating magnetic field MF at the detection position PR. The third magnetic anisotropy is a shape magnetic anisotropy, for example.

In the present embodiment, in the one of the at least one first magnetic detection element and the at least one second magnetic detection element, the magnetic layer provided with the third magnetic anisotropy is other than the first or second magnetic layer.

In the present embodiment, the error that the third harmonic magnetic field components MF1a and MF2a cause in the detected angle value θs, that is, the magnetic-field-related second-order angular error described in relation to the first embodiment, is corrected by using the first or second magnetic anisotropy in the other of the at least one first magnetic detection element and the at least one second magnetic detection element, and the third magnetic anisotropy. The third magnetic anisotropy and the first or second magnetic anisotropy used to correct the magnetic-field-related second-order angular error establish the same easy axis direction.

Reference is now made to FIG. 18 to describe in detail a first example of configuration of the first and second detection signal generation units 111 and 112. In the first example, the first detection signal generation unit 111 has a Wheatstone bridge circuit 114 in place of the Wheatstone bridge circuit 14 of the first embodiment. The second detection signal generation unit 112 has a Wheatstone bridge circuit 116 in place of the Wheatstone bridge circuit 16 of the first embodiment.

Each of the Wheatstone bridge circuits 114 and 116 includes magnetic detection elements R11, R12, R21, R22, R31, R32, R41 and R42, a power supply port V, a ground port G, a first output port E1, and a second output port E2.

The magnetic detection elements R11 and R12 are connected in series and provided between the power supply port V and the first output port E1. The magnetic detection elements R21 and R22 are connected in series and provided between the first output port E1 and the ground port G. The magnetic detection elements R31 and R32 are connected in series and provided between the the power supply port V and the second output port E2. The magnetic detection elements R41 and R42 are connected in series and provide between the second output port E2 and the ground port G. A power supply voltage of predetermined magnitude is applied to the power supply port V. The ground port G is grounded.

Each of the magnetic detection elements R11, R12, R21, R22, R31, R32, R41 and R42 includes one or more MR elements. Each MR element has the same configuration as in the first embodiment.

In the first detection signal generation unit 111, the magnetization pinned layers of the MR elements included in the magnetic detection elements R11, R12, R41 and R42 are magnetized in the first direction D1 (the X direction), and the magnetization pinned layers of the MR elements included in the magnetic detection elements R21, R22, R31 and R32 are magnetized in the opposite direction to the first direction D1.

In the second detection signal generation unit 112, the magnetization pinned layers of the MR elements included in the magnetic detection elements R11, R12, R41 and R42 are magnetized in the second direction D2 (the Y direction), and the magnetization pinned layers of the MR elements included in the magnetic detection elements R21, R22, R31 and R32 are magnetized in the opposite direction to the second direction D2.

In the light of the production accuracy of the MR elements and other factors, the magnetization directions of the magnetization pinned layers of the MR elements in the detection signal generation units 111 and 112 may be slightly different from the above-described directions.

In the first example, the free layer of at least one of the one or more MR elements included in each of the magnetic detection elements R11, R12, R21, R22, R31, R32, R41 and R42 in the first detection signal generation unit 111 is provided with the first magnetic anisotropy. The free layer provided with the first magnetic anisotropy corresponds to the first magnetic layer.

The free layer of at least one of the one or more MR elements included in each of the magnetic detection elements R11, R21, R31 and R41 in the second detection signal generation unit 112 is provided with the second magnetic anisotropy. The free layer provided with the second magnetic anisotropy corresponds to the second magnetic layer.

The free layer of at least one of the one or more MR elements included in each of the magnetic detection elements R12, R22, R32 and R42 in the second detection signal generation unit 112 is provided with the third magnetic anisotropy.

In FIG. 18, the major axis direction of the ellipses representing the magnetic detection elements corresponds to the easy axis direction established by the magnetic anisotropy. In the first example, the easy axis direction established by the first magnetic anisotropy is parallel to the X direction, and the easy axis direction established by the second magnetic anisotropy is parallel to the Y direction. Further, the easy axis direction established by the third magnetic anisotropy is parallel to the X direction, as with the the easy axis direction established by the first magnetic anisotropy.

Second to fourth examples of configuration of the first and second detection signal generation units 111 and 112 will now be described. In the second example, the at least one first magnetic detection element in the first detection signal generation unit 111 includes a magnetic layer provided with the third magnetic anisotropy. In this case, for example, the free layer of at least one of the one or more MR elements included in each of the magnetic detection elements R12, R22, R32 and R42 in the first detection signal generation unit 111 is provided with the third magnetic anisotropy, and the free layer of at least one of the one or more MR elements included in each of the magnetic detection elements R12, R22, R32 and R42 in the second detection signal generation unit 112 is provided with the second magnetic anisotropy.

The easy axis direction established by the third magnetic anisotropy in this case is parallel to the Y direction, as with the easy axis direction established by the second magnetic anisotropy.

In the third and fourth examples, like the example shown in FIG. 5 in the first embodiment, the easy axis direction established by the first magnetic anisotropy is parallel to the Y direction, and the easy axis direction established by the second magnetic anisotropy is parallel to the X direction.

In the third example, the at least one second magnetic detection element in the second detection signal generation unit 112 includes a magnetic layer provided with the third magnetic anisotropy. In this case, the easy axis direction established by the third magnetic anisotropy is parallel to the Y direction, as with the easy axis direction established by the first magnetic anisotropy.

In the fourth example, the at least one first magnetic detection element in the first detection signal generation unit 111 includes a magnetic layer provided with the third magnetic anisotropy. In this case, the easy axis direction established by the third magnetic anisotropy is parallel to the X direction, as with the easy axis direction established by the second magnetic anisotropy.

In the light of the production accuracy of the MR elements and other factors, the easy axis directions in the foregoing first to fourth examples may be slightly different from the above-described directions.

The configuration of the angle detection unit 20 of the present embodiment will now be described with reference to FIG. 19. The angle detection unit 20 of the present embodiment is configured by eliminating the correction processing unit 23 from the angle detection unit 20 of the first embodiment. In the angle detection unit 20 of the present embodiment, the first and second detection signals S1 and S2, which have been converted into digital signals by the A/D converters 21 and 22, are inputted to the angle computation unit 24. The angle computation unit 24 computes the detected angle value θs by performing the angle computation defined by Eq. (14) using the first and second detection signals S1 and S2.

The function and effects of the angle sensor system 1 according to the present embodiment will now be described. First, assume that the first and second magnetic field components MF1 and MF2 consist only of the ideal magnetic field components MF10 and MF20, respectively, when the target angle θ varies with a predetermined period. In such a case, the third magnetic anisotropy and the first or second magnetic anisotropy used to correct the magnetic-field-related second-order angular error cause an angular error that varies with ½ the predetermined period in the detected angle value θs. This angular error will hereinafter be referred to as "element-related second-order angular error", and denoted by the symbol Ed.

Figure 20:
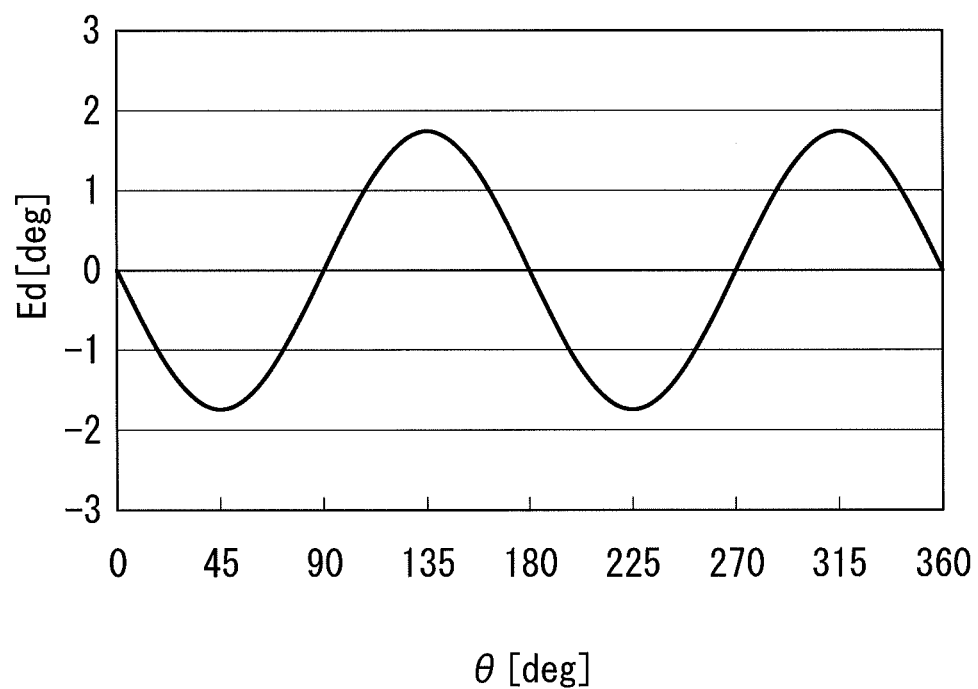
FIG. 20 is a waveform diagram illustrating the waveform of an angular error resulting from a first or second magnetic anisotropy and a third magnetic anisotropy in the second embodiment of the invention.

FIG. 20 illustrates an example waveform of the element-related second-order angular error Ed for the first example shown in FIG. 18. In FIG. 20, the horizontal axis represents the target angle θ, and the vertical axis represents the element-related second-order angular error Ed.

When the easy axis direction established by the third magnetic anisotropy is parallel to the X direction as in the third and fourth examples, the phase of the element-related second-order angular error Ed has the waveform shown in FIG. 20. On the other hand, when the easy axis direction established by the third magnetic anisotropy is parallel to the Y direction as in the second and third examples, the element-related second-order angular error Ed has a phase 90° different from the phase of the waveform shown in FIG. 20.

The amplitude of the element-related second-order angular error Ed can be changed by changing the magnitudes of the third magnetic anisotropy and the first or second magnetic anisotropy used to correct the magnetic-field-related second-order angular error.

In the present embodiment, the third magnetic anisotropy and the first or second magnetic anisotropy for correcting the magnetic-field-related second-order angular error are set to cause the magnetic-field-related second-order angular error and the element-related second-order angular error Ed to have a phase difference of 90° or near 90° and have the same or almost the same amplitude. Correction of the magnetic-field-related second-order angular error is thereby achieved.

The present embodiment eliminates the need for the correction processing unit 23 of the first embodiment, thereby enabling reduction of the angular error associated with the rotating magnetic field MF generated by the magnetic field generation unit with a simpler configuration.

The other configuration, function and effects of the present embodiment are the same as those of the first embodiment.

[Third Embodiment]

Figure 21:
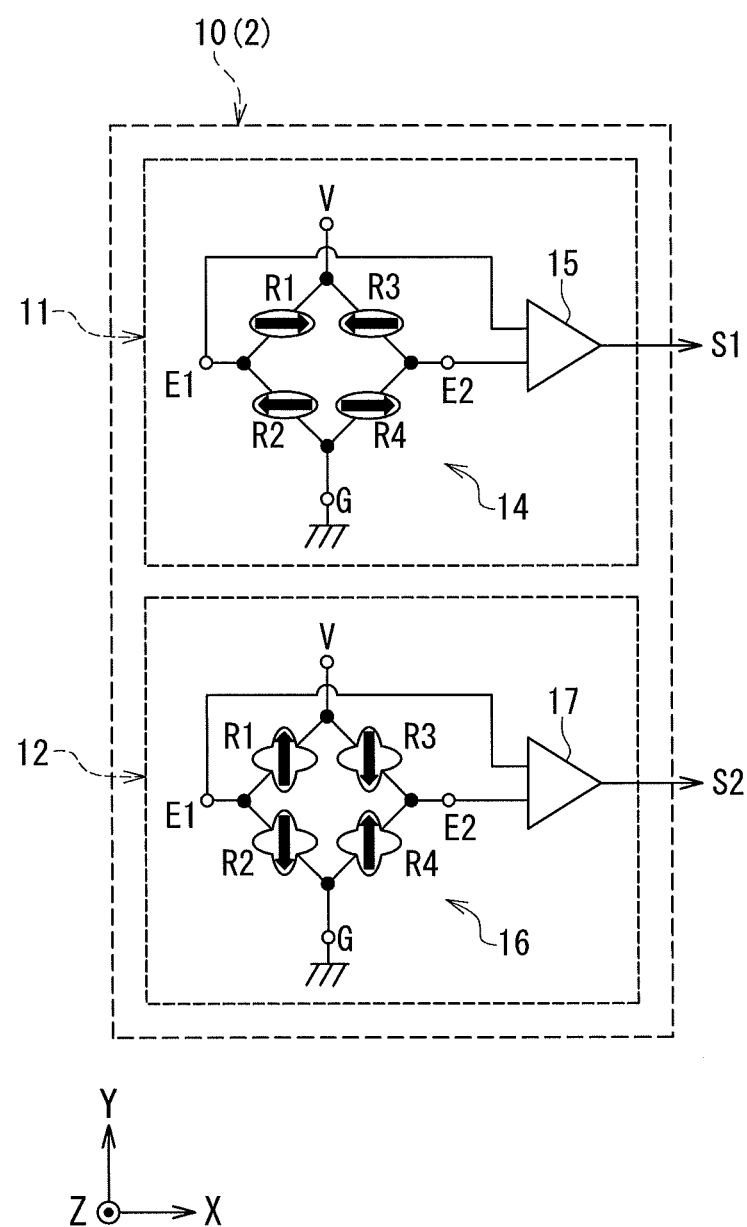
FIG. 21 is a circuit diagram illustrating the configuration of a detection unit of an angle sensor of a third embodiment of the invention.

A third embodiment of the present invention will now be described. FIG. 21 is a circuit diagram illustrating a first example of configuration of the detection unit of the third embodiment. The angle sensor system 1 according to the third embodiment differs from the first embodiment in the following ways.

In the angle sensor 2 of the angle sensor system 1 according to the present embodiment, either one of the at least one first magnetic detection element included in the first detection signal generation unit 11 and the at least one second magnetic detection element included in the second detection signal generation unit 12 includes a magnetic layer provided with a third magnetic anisotropy. The magnetic layer provided with the third magnetic anisotropy is a layer whose magnetization direction varies according to the direction DM of the rotating magnetic field MF at the detection position PR. The third magnetic anisotropy is a shape magnetic anisotropy, for example.

According to the present embodiment, in the one of the at least one first magnetic detection element and the at least one second magnetic detection element, the first or second magnetic layer is provided with the third magnetic anisotropy in addition to the first or second magnetic anisotropy. The details of the first to third magnetic anisotropies are the same as those in the second embodiment.

In the present embodiment, the angle detection unit 20 of the second embodiment shown in FIG. 19 is provided in place of the angle detection unit 20 of the first embodiment.

A first example of configuration of the first and second detection signal generation units 11 and 12 will now be described in detail with reference to FIG. 21. In the first example, each of the magnetic detection elements R1, R2, R3 and R4 in the second detection signal generation unit 12 includes at least one MR element that includes a free layer provided with the second magnetic anisotropy. The free layer provided with the second magnetic anisotropy corresponds to the second magnetic layer. In the first example, the free layer serving as the second magnetic layer is provided with the third magnetic anisotropy in addition to the second magnetic anisotropy. FIG. 21 illustrates an example shape of the second magnetic layer. Forming the second magnetic layer into a shape having a first major axis parallel to the Y direction and a second major axis parallel to the X direction, that is, a generally cross-like shape, provides the second magnetic layer with the second magnetic anisotropy and the third magnetic anisotropy, both of which are shape magnetic anisotropies. The easy axis direction established by the third magnetic anisotropy in this case is parallel to the X direction, as with the easy axis direction established by the first magnetic anisotropy.

Second to fourth examples of configuration of the first and second detection signal generation units 11 and 12 will now be described. In the second example, the at least one first magnetic detection element in the first detection signal generation unit 11 includes a magnetic layer provided with the first and third magnetic anisotropies. In this case, for example, the free layer of at least one of the one or more MR elements included in each of the magnetic detection elements R1, R2, R3 and R4 in the first detection signal generation unit 11 is provided with the first and third magnetic anisotropies, and the free layer of at least one of the one or more MR elements included in each of the magnetic detection elements R1, R2, R3 and R4 in the second detection signal generation unit 12 is provided with only the second magnetic anisotropy. The easy axis direction established by the third magnetic anisotropy in this case is parallel to the Y direction, as with the easy axis direction established by the second magnetic anisotropy.

In the third and fourth examples, like the example shown in FIG. 5 in the first embodiment, the easy axis direction established by the first magnetic anisotropy is parallel to the Y direction, and the easy axis direction established by the second magnetic anisotropy is parallel to the X direction.

In the third example, the at least one second magnetic detection element in the second detection signal generation unit 12 includes a magnetic layer provided with the second and third magnetic anisotropies. In this case, the easy axis direction established by the third magnetic anisotropy is parallel to the Y direction, as with the easy axis direction established by the first magnetic anisotropy.

In the fourth example, the at least one first magnetic detection element in the first detection signal generation unit 11 includes a magnetic layer provided with the first and third magnetic anisotropies. In this case, the easy axis direction established by the third magnetic anisotropy is parallel to the X direction, as with the easy axis direction established by the second magnetic anisotropy.

In the light of the production accuracy of the MR elements and other factors, the easy axis directions in the foregoing first to fourth examples may be slightly different from the above-described directions.

In the present embodiment, the magnetic-field-related second-order angular error is corrected by using the third magnetic anisotropy and the first or second magnetic anisotropy. Like the second embodiment, the present embodiment eliminates the need for the correction processing unit 23 of the first embodiment, thereby enabling reduction of the angular error associated with the rotating magnetic field MF generated by the magnetic field generation unit with a simpler configuration.

The other configuration, function and effects of the present embodiment are the same as those of the first or second embodiment.

[Fourth Embodiment]

A fourth embodiment of the present invention will now be described with reference to FIG. 22 to FIG. 25. FIG. 22 to FIG. 25 respectively illustrate first to fourth states of the angle sensor system 1 according to the fourth embodiment.

The angle sensor system 1 according to the fourth embodiment differs from the first embodiment in the following ways. The magnetic field generation unit of the angle sensor system 1 according to the fourth embodiment is a magnet 8 different from the magnet 5 of the first embodiment. The magnet 8 includes a plurality of pairs of N and S poles arranged alternately in the first direction. The first direction is the X direction.

In FIG. 22 to FIG. 25, the X direction is rightward, the Y direction is upward, and the Z direction is out of the plane of the drawing. The magnet 8 has a side surface 8a parallel to the X direction. In the present embodiment, the detection unit 10 of the angle sensor 2 is situated to face the side surface 8a of the magnet 8. FIG. 22 to FIG. 25 illustrate a plurality of curves near the side surface 8a of the magnet 8, the plurality of curves representing magnetic lines of force.

Either the angle sensor 2 or the magnet 8 is movable linearly in a direction DL parallel to the first direction (the X direction) in response to the movement of a moving body (not illustrated). In other words, the relative position of the magnet 8 with respect to the detection position PR is variable in the first direction (the X direction). In the example shown in FIG. 22, the direction DL is the X direction.

The reference plane in the present embodiment is perpendicular to the Z direction. As the relative position of the magnet 8 with respect to the detection position PR moves in the direction DL, the direction DM of the rotating magnetic field MF rotates counterclockwise in FIG. 22. The target angle θ and the rotating field angle θM will be expressed in positive values when seen counterclockwise from the reference direction DR, and in negative values when seen clockwise from the reference direction DR. The definitions of the first direction D1, the second direction D2, the first magnetic field component MF1 and the second magnetic field component MF2 are the same as those in the first embodiment.

The angle sensor 2 detects the rotating magnetic field MF at the detection position PR and generates the detected angle value θs having a correspondence with the target angle θ. In the present embodiment, the target angle θ is an angle that represents the relative position of the magnet 8 with respect to the detection position PR with one pitch of the magnet 8 as 360°.

Figure 22:
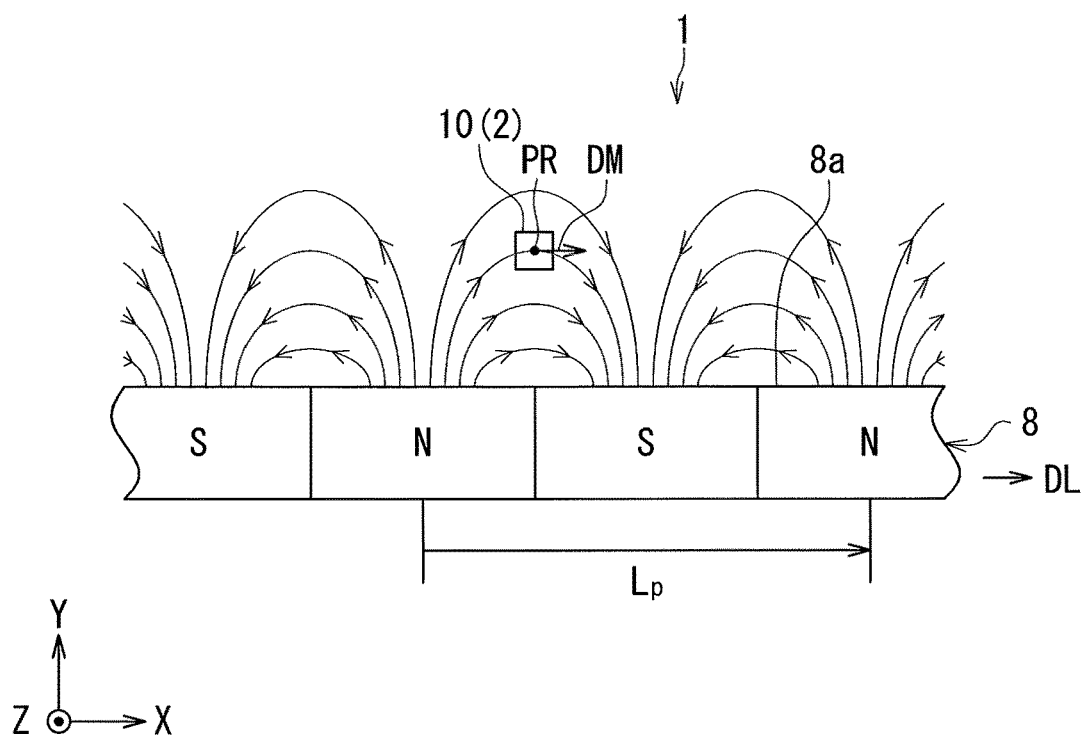
FIG. 22 is an explanatory diagram illustrating a first state of an angle sensor system according to a fourth embodiment of the invention.
Figure 23:
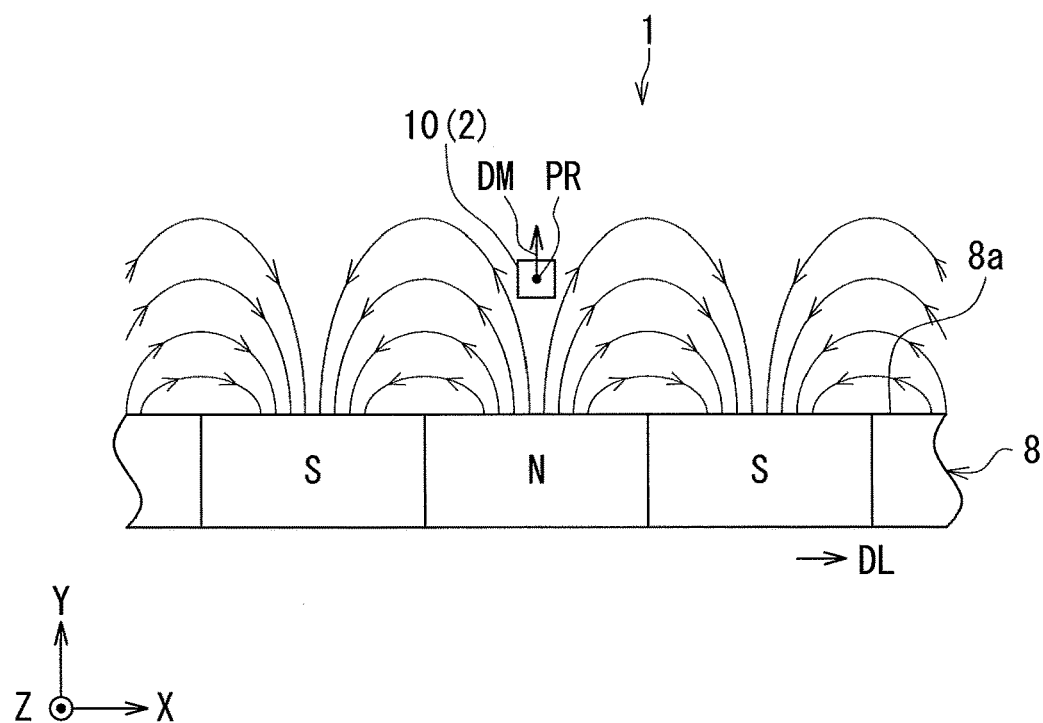
FIG. 23 is an explanatory diagram illustrating a second state of the angle sensor system according to the fourth embodiment of the invention.

In the first state shown in FIG. 22, the detection position PR is situated in an imaginary plane including the boundary between neighboring N and S poles of the magnet 8. In the first state, the target angle θ is 0°. The second state shown in FIG. 23 is where the magnet 8 has moved by ¼ pitch from the first state in the direction DL. In the second state, the target angle θ is 90°.

Figure 24:
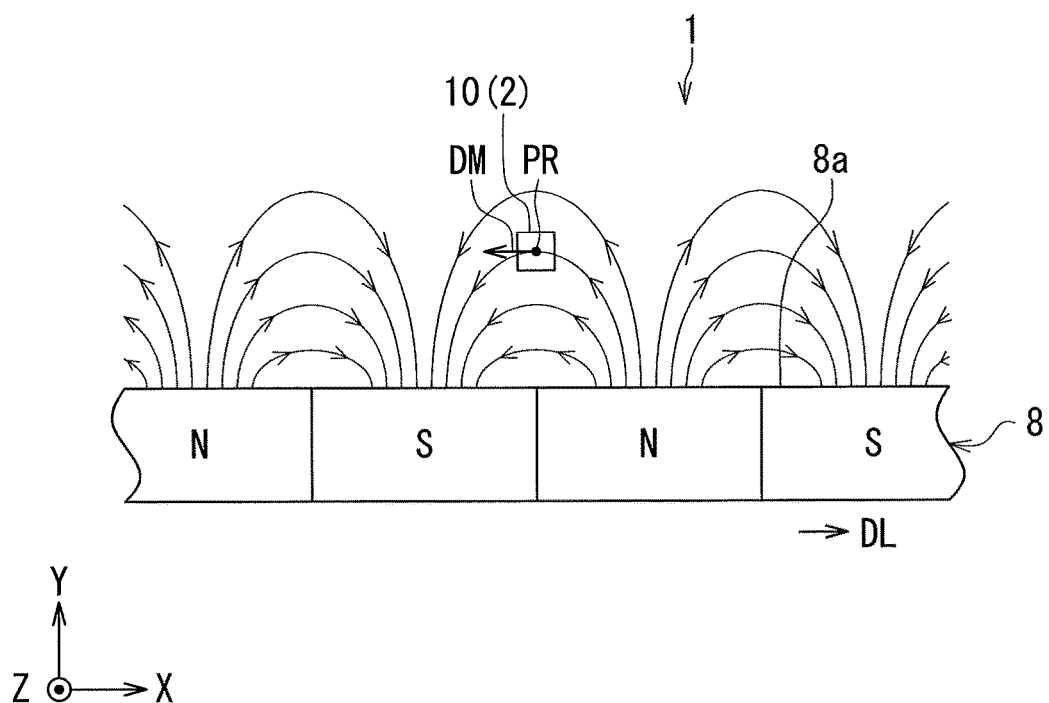
FIG. 24 is an explanatory diagram illustrating a third state of the angle sensor system according to the fourth embodiment of the invention.

The third state shown in FIG. 24 is where the magnet 8 has moved by ¼ pitch from the second state in the direction DL. In the third state, the target angle θ is 180°.

Figure 25:
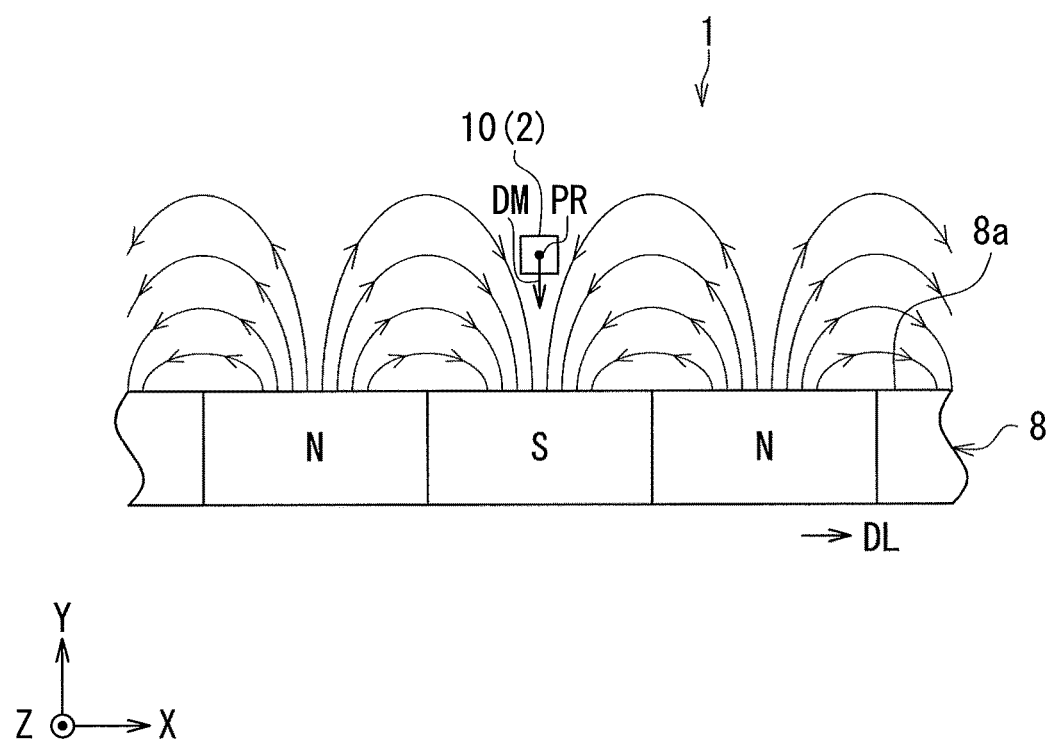
FIG. 25 is an explanatory diagram illustrating a fourth state of the angle sensor system according to the fourth embodiment of the invention.

The fourth state shown in FIG. 25 is where the magnet 8 has moved by ¼ pitch from the third state in the direction DL. In the fourth state, the target angle θ is 270°.

A movement of the magnet 8 by ¼ pitch from the fourth state in the direction DL brings about the first state shown in FIG. 22.

In the present embodiment, when the target angle θ varies with a predetermined period, each of the first magnetic field component MF1 and the second magnetic field component MF2 of the rotating magnetic field MF contains the ideal magnetic field component, the third harmonic magnetic field component and the fifth harmonic magnetic field component, as in the first embodiment.

The angle sensor 2 according to the present embodiment may have the same configuration as that in the first embodiment, the second embodiment, or the third embodiment.

The other configuration, function and effects of the present embodiment are the same as those of any of the first to third embodiments.

The present invention is not limited to the foregoing embodiments, and various modifications may be made thereto. For example, the magnetic detection elements in the present invention are not limited to spin-valve MR elements (GMR and TMR elements) or AMR elements, and may be any magnetic detection elements that have a magnetic layer whose magnetization direction varies according to the direction of a rotating magnetic field. For example, Hall elements each including a ferromagnetic layer and using ferromagnetic Hall effects may be used as the magnetic detection elements.

The magnetic anisotropy provided to the magnetic layer is not limited to shape magnetic anisotropy, and may be magnetocrystalline anisotropy or stress-induced magnetic anisotropy.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. An angle sensor system comprising: a magnetic field generation unit for generating a rotating magnetic field whose direction at a predetermined detection position varies according to an angle to be detected; and an angle sensor for detecting the rotating magnetic field at the detection position and generating a detected angle value having a correspondence with the angle to be detected, wherein the rotating magnetic field at the detection position contains a first magnetic field component in a first direction, and a second magnetic field component in a second direction orthogonal to the first direction, the angle sensor includes:
   a first detection signal generation unit for generating a first detection signal having a correspondence with the cosine of an angle that the direction of the rotating magnetic field at the detection position forms with respect to the first direction; a second detection signal generation unit for generating a second detection signal having a correspondence with the sine of the angle that the direction of the rotating magnetic field at the detection position forms with respect to the first direction; and an angle detection unit for generating the detected angle value on the basis of the first and second detection signals, the first detection signal generation unit includes at least one first magnetic detection element, the at least one first magnetic detection element includes a first magnetic layer whose magnetization direction varies according to the direction of the rotating magnetic field at the detection position, the first magnetic layer is provided with a first magnetic anisotropy, the second detection signal generation unit includes at least one second magnetic detection element, the at least one second magnetic detection element includes a second magnetic layer whose magnetization direction varies according to the direction of the rotating magnetic field at the detection position, the second magnetic layer is provided with a second magnetic anisotropy, when the angle to be detected varies with a predetermined period, each of the first and second magnetic field components contains an ideal magnetic field component and a fifth harmonic magnetic field component, wherein the ideal magnetic field component varies periodically in such a manner as to trace an ideal sinusoidal curve, and the fifth harmonic magnetic field component is an error component corresponding to a fifth harmonic of the ideal magnetic field component, the fifth harmonic magnetic field component causes an error that varies with $\frac{1}{4}$ the predetermined period in the detected angle value, assuming that each of the first and second magnetic field components consists only of the ideal magnetic field component when the angle to be detected varies with the predetermined period, each of the first and second detection signals contains an ideal signal component and a third harmonic signal component, wherein the ideal signal component varies periodically in such a manner as to trace an ideal sinusoidal curve, and the third harmonic signal component is an error component corresponding to a third harmonic of the ideal signal component, the third harmonic signal component results from the first and second magnetic anisotropies and causes an error that varies with $\frac{1}{4}$ the predetermined period in the detected angle value, and the first and second magnetic anisotropies are set to allow the detected angle value to contain a reduced error that varies with $\frac{1}{4}$ the predetermined period, as compared with both of the error to be caused in the detected angle value by the fifth harmonic magnetic field component only and the error to be caused in the detected angle value by the third harmonic signal component only.

2. The angle sensor system according to claim 1, wherein the error to be caused in the detected angle value by the fifth harmonic magnetic field component only and the error to be caused in the detected angle value by the third harmonic signal component only have a phase difference of 45°.

3. The angle sensor system according to claim 1, wherein both of the first and second magnetic anisotropies are shape magnetic anisotropies.

4. The angle sensor system according to claim 1, wherein an easy axis direction established by the first magnetic anisotropy and an easy axis direction established by the second magnetic anisotropy are orthogonal to each other.

5. The angle sensor system according to claim 1, wherein
   when the angle to be detected varies with the predetermined period, each of the first and second magnetic field components further contains a third harmonic magnetic field component, the third harmonic magnetic field component being an error component corresponding to a third harmonic of the ideal magnetic field component,
   the third harmonic magnetic field component causes an error that varies with $\frac{1}{2}$ the predetermined period in the detected angle value, and
   the angle sensor corrects the error that the third harmonic magnetic field component causes in the detected angle value.

6. The angle sensor system according to claim 5, wherein the angle detection unit performs correction processing to correct the error that the third harmonic magnetic field component causes in the detected angle value.

7. The angle sensor system according to claim 6, wherein
   the correction processing includes performing conversion computation to convert the first and second detection signals into first and second computation signals to be used for angle computation for computing the detected angle value, and
   the conversion computation converts the first and second detection signals into the first and second computation signals so as to allow the detected angle value to contain a reduced error that varies with $\frac{1}{2}$ the predetermined period, as compared with the case of computing the detected angle value by using the first and second detection signals in the angle computation.

8. The angle sensor system according to claim 5, wherein either one of the at least one first magnetic detection element and the at least one second magnetic detection element includes a magnetic layer provided with a third magnetic anisotropy, wherein the magnetic layer provided with the third magnetic anisotropy is a layer whose magnetization direction varies according to the direction of the rotating magnetic field at the detection position, and the error that the third harmonic magnetic field component causes in the detected angle value is corrected by using the first or second magnetic anisotropy in the other of the at least one first magnetic detection element and the at least one second magnetic detection element, and the third magnetic anisotropy.

9. The angle sensor system according to claim 8, wherein the third magnetic anisotropy is a shape magnetic anisotropy.

10. The angle sensor system according to claim 8, wherein, in the one of the at least one first magnetic detection element and the at least one second magnetic detection element, the magnetic layer provided with the third magnetic anisotropy is other than the first or second magnetic layer.

11. The angle sensor system according to claim 8, wherein, in the one of the at least one first magnetic detection element and the at least one second magnetic detection element, the first or second magnetic layer is provided with the third magnetic anisotropy in addition to the first or second magnetic anisotropy.

12. The angle sensor system according to claim 8, wherein the third magnetic anisotropy and the first or second magnetic anisotropy used to correct the error that the third harmonic magnetic field component causes in the detected angle value establish the same easy axis direction.

13. The angle sensor system according to claim 1, wherein the at least one first magnetic detection element and the at least one second magnetic detection element each include one or more magnetoresistance elements.

14. The angle sensor system according to claim 1, wherein
the magnetic field generation unit is a magnet that is rotatable about a central axis,
the detection position is located off the central axis, and
the angle to be detected corresponds to a rotational position of the magnet.

15. The angle sensor system according to claim 1, wherein
the magnetic field generation unit is a magnet including a plurality of pairs of N and S poles arranged alternately in the first direction,
a relative position of the magnet with respect to the detection position is variable in the first direction, and
the angle to be detected is an angle that represents the relative position of the magnet with respect to the detection position with one pitch of the magnet as 360°.

* * * * *